United States Patent
Ben Dror et al.

(10) Patent No.: US 10,023,474 B2
(45) Date of Patent: Jul. 17, 2018

(54) METHODS FOR ADSORPTION AND BIODEGRADATION OF PETROLEUM

(71) Applicant: NanoSpun Technologies Ltd., Haifa (IL)

(72) Inventors: Ohad Ben Dror, Haifa (IL); Eyal Zussman, Haifa (IL); Yael Dror, Haifa (IL)

(73) Assignee: NANOSPUN TECHNOLOGIES LTD., Haifa (IL)

(*) Notice: Subject to any disclaimer, the term of this patent is extended or adjusted under 35 U.S.C. 154(b) by 318 days.

(21) Appl. No.: 14/412,474

(22) PCT Filed: Jul. 3, 2013

(86) PCT No.: PCT/IL2013/050569
§ 371 (c)(1),
(2) Date: Jan. 2, 2015

(87) PCT Pub. No.: WO2014/006621
PCT Pub. Date: Jan. 9, 2014

(65) Prior Publication Data
US 2015/0183661 A1    Jul. 2, 2015

Related U.S. Application Data

(60) Provisional application No. 61/667,690, filed on Jul. 3, 2012.

(51) Int. Cl.
C02F 1/28     (2006.01)
C02F 1/68     (2006.01)
(Continued)

(52) U.S. Cl.
CPC ............... *C02F 1/28* (2013.01); *C02F 1/681* (2013.01); *C02F 3/109* (2013.01); *C02F 3/344* (2013.01); *C02F 2101/32* (2013.01); *C02F 2103/08* (2013.01); *C02F 2203/006* (2013.01); *C02F 2305/08* (2013.01)

(58) Field of Classification Search
CPC ............ C02F 1/28; C02F 1/681; C02F 3/109
See application file for complete search history.

(56) References Cited

U.S. PATENT DOCUMENTS 6,287,496 B1 * 9/2001 Lownds ................. C05F 11/02
                                                  264/118
2011/0280660 A1   11/2011 Bahukudumbi et al.
(Continued)

OTHER PUBLICATIONS

Moura et al. ("Catalytic growth of carbon nanotubes and nanofibers on vermiculite to produce floatable hydrophobic "nanosponges" for oil spill remediation," Applied Catalysis B: Environmental 90 (2009) 436-440.*
Hashim, D. P., et al., "Covalently bonded three-dimensional carbon nanotube solids via boron induced nanojunctions," Scientific Reports, Apr. 2012, pp. 1-8.*
(Continued)

*Primary Examiner* — Chester T Barry
(74) *Attorney, Agent, or Firm* — Roach Brown McCarthy & Gruber, P.C.; Kevin D. McCarthy

(57) ABSTRACT

Provided are methods of petroleum sequestration, which use electrospun microtubes capable of sequestering the petroleum from the water, and method of depleting and optionally degrading petroleum from water using floating devices which comprise the electrospun microtube attached to a floating carrier.

14 Claims, 11 Drawing Sheets

(51) Int. Cl.
  *C02F 3/10* (2006.01)
  *C02F 3/34* (2006.01)
  *C02F 101/32* (2006.01)
  *C02F 103/08* (2006.01)

(56) References Cited

U.S. PATENT DOCUMENTS

2012/0189795 A1* 7/2012 Wong .................. D01D 5/0069
                                                                 428/36.91
2012/0238021 A1* 9/2012 Hashim .................. C01B 35/00
                                                                 435/395

OTHER PUBLICATIONS

Gui, X., et al., "Carbon Nanotube Sponges," Advanced Materials, www.materialsviews.com, Advanced Materials (2010), 22, 617-621.*
Haitao Zhu, Shanshan Qiu, Wei Jiang, Daxiong Wu, Canying Zhang, Evaluation of Electrospun Polyvinyl Chloride/Polystyrene Fibers as Sorbent Materials for Oil Spill Cleanup, Environ. Sci. Technol., 2011, 45 (10), pp. 4527-4531.
Alon Nardi, Ron Avraham, Eyal Zussman, J. Stefan Rokem, Charles L. Greenblatt, Phenol Biodegradation by Corynebacterium glutamicum Encapsulated in Electrospun Fibers, Journal of Environmental Protection vol. 3 No. 2 (2012), Article ID: 17442, pp. 164-168.

* cited by examiner

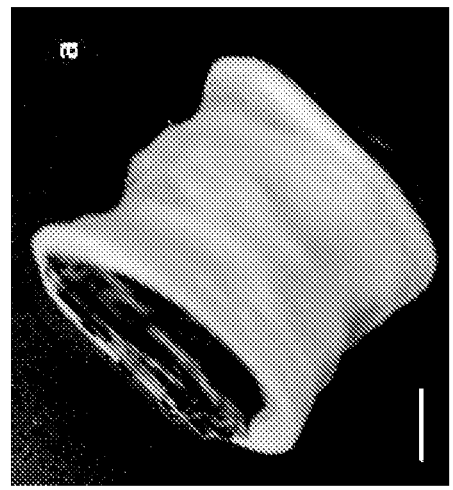
FIG. 1A
FIG. 1B

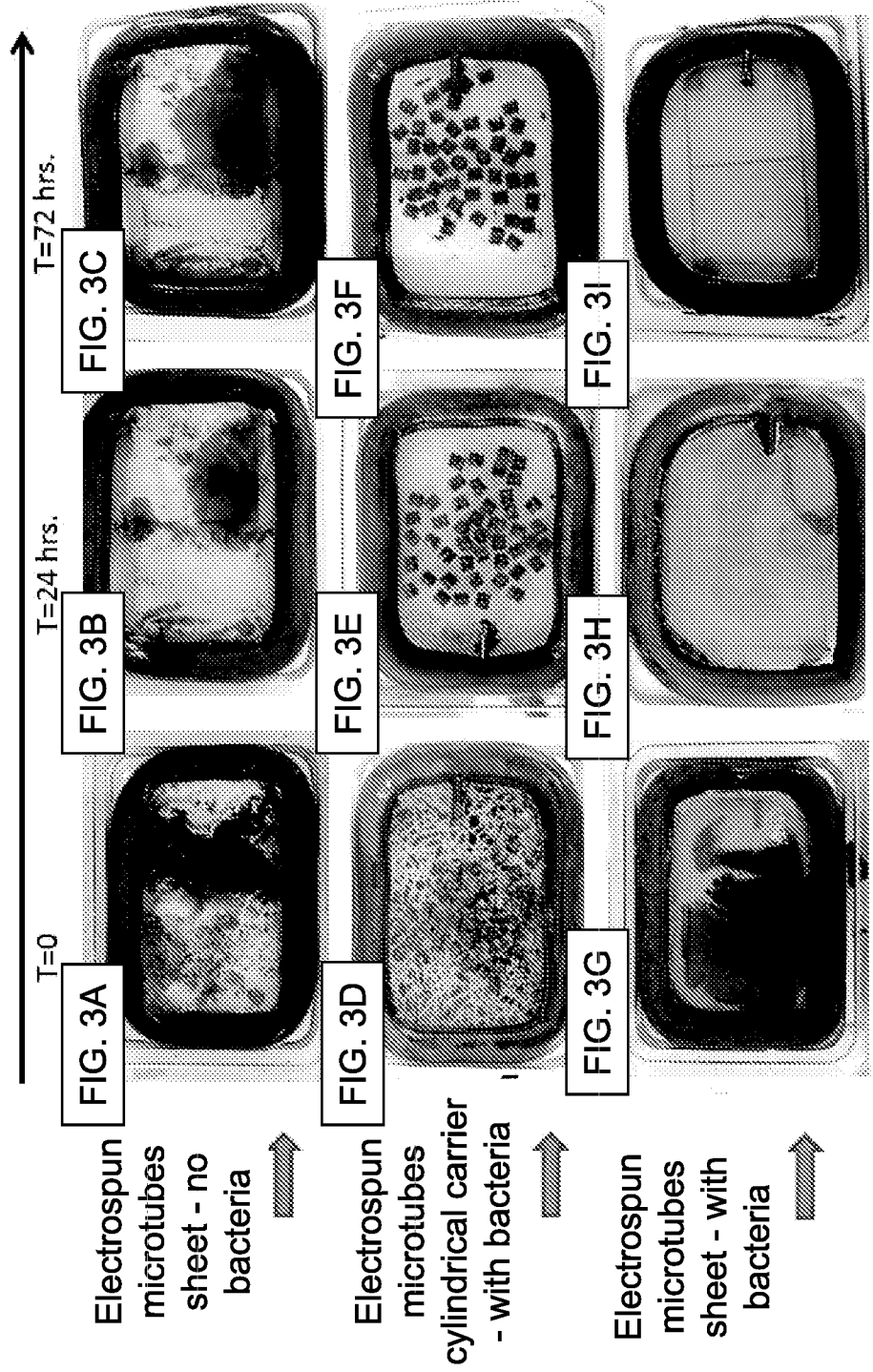

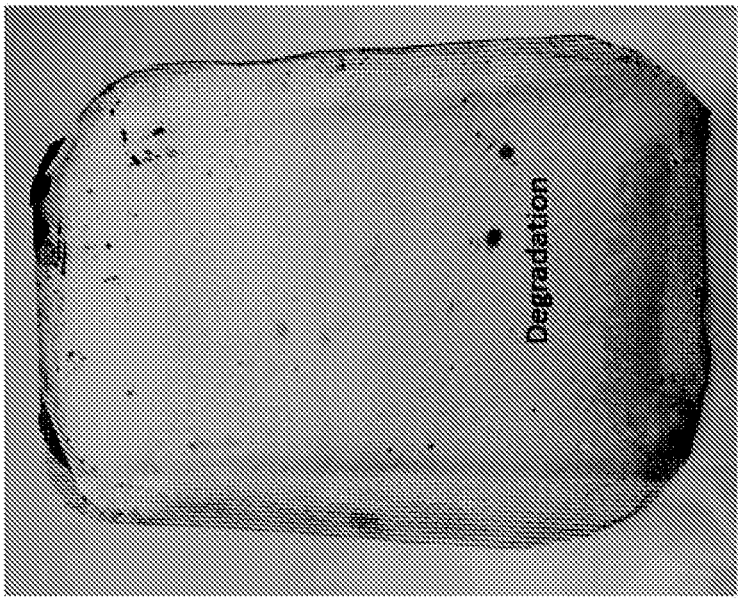
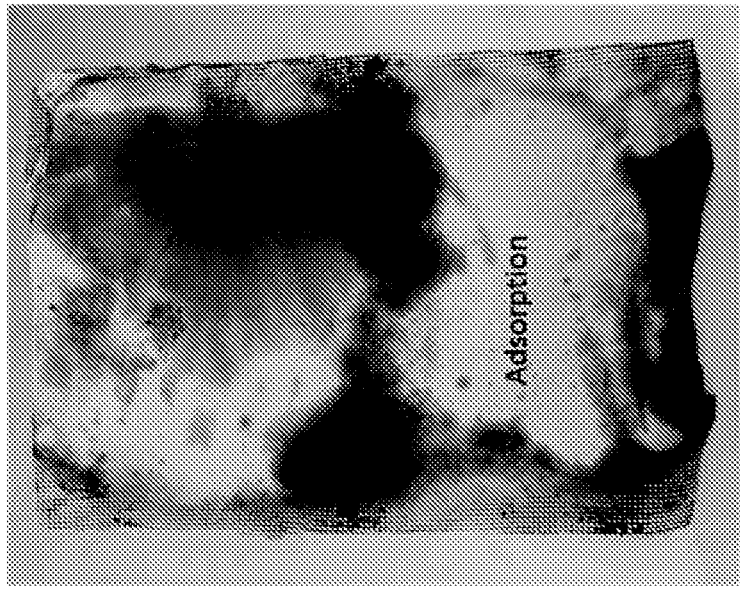
FIG. 4B
FIG. 4A

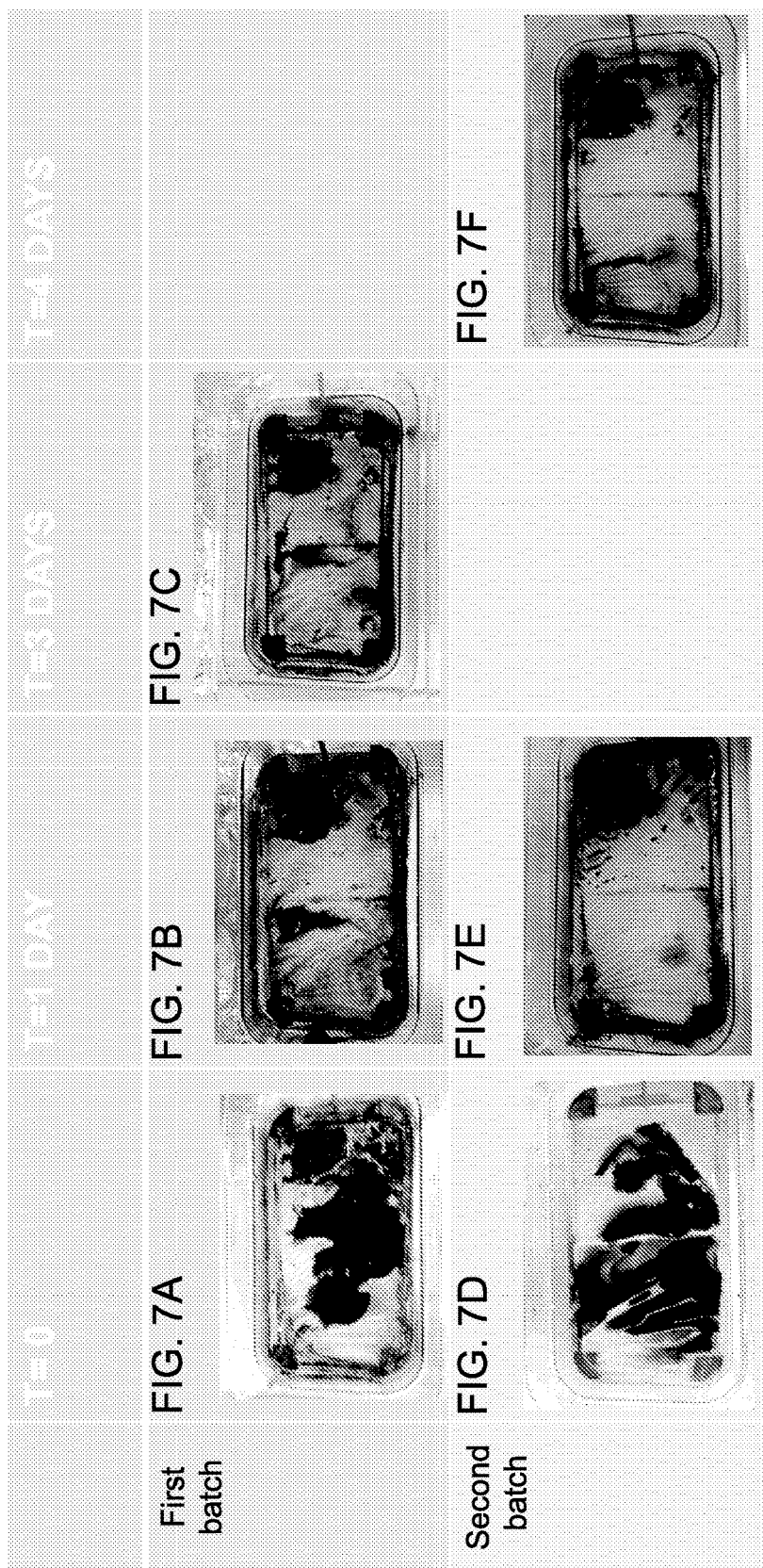

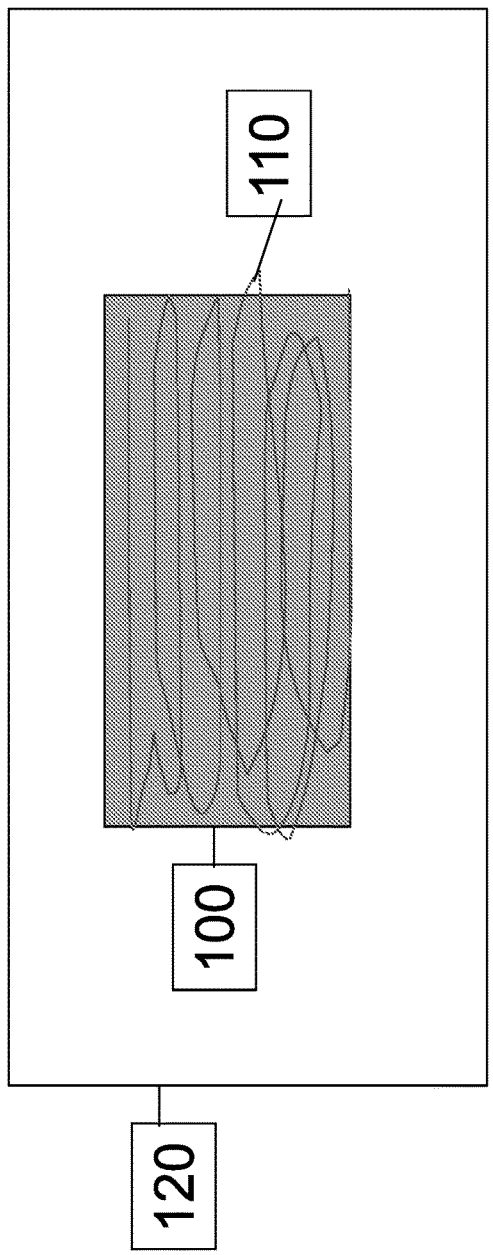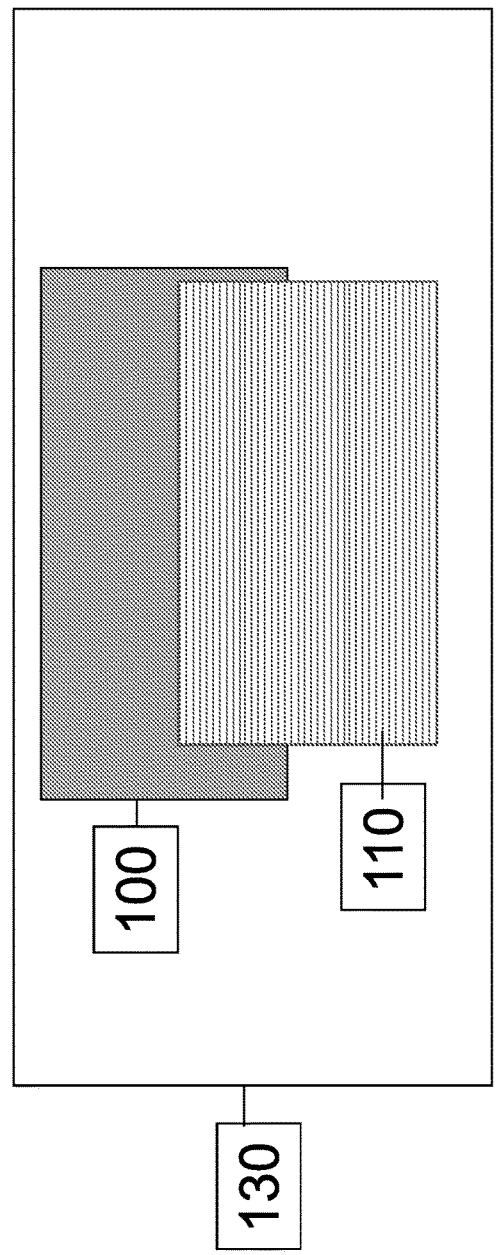

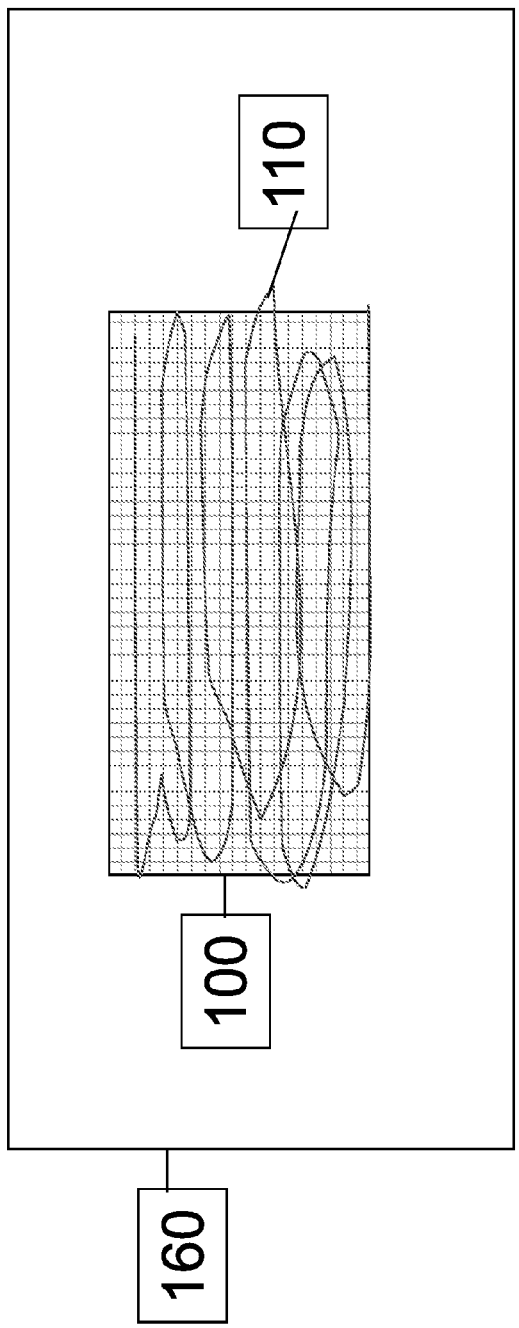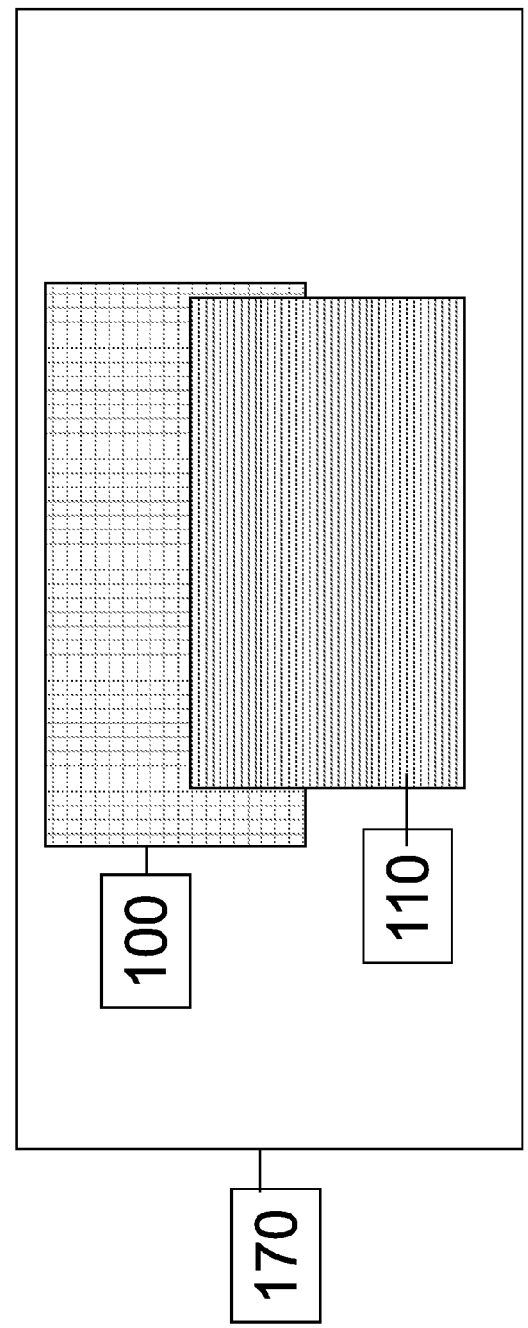

METHODS FOR ADSORPTION AND BIODEGRADATION OF PETROLEUM

FIELD AND BACKGROUND OF THE INVENTION

The present invention, in some embodiments thereof, relates to methods and devices for sequestration and/or depletion of petroleum from water, and, more particularly, but not exclusively, to the use of electrospun microtubes for adsorption and/or sequestration of petroleum from the water, and optionally for further bioremediation of petroleum using the electrospun microtubes with bacteria encapsulated in or immobilized to.

Oil spills are caused by various triggering events and may reach hundreds of million gallons annually. These include for example, accidents and big spills (37 millions of gallons per year); routine maintenance which involves bilge cleaning and other ship operations (137 millions of gallons per year); used engine oil which ends up in waterways (363 millions of gallons per year); air pollution, mainly from cars and industry, which places hundreds of tons of hydrocarbons into the oceans each year (92 millions of gallons per year); off shore drilling (15 millions of gallons per year); and natural seeps (62 millions of gallons per year).

Crude oil and refined fuel spills from tanker ship accidents have damaged natural ecosystems in Alaska, the Gulf of Mexico, the Galapagos Islands, France and many other places. The quantity of oil spilled during accidents has ranged from a few hundred tons to several hundred of thousands tons. For example, the deepwater horizon oil spill in the Gulf of Mexico in 2006 on the BP-operated Macondo Prospect, which is considered the largest accidental marine oil spill in the history of the petroleum industry, involved a total discharge of oil estimated at 4.9 million barrels (210 million US gal; 780,000 m$^3$).

Smaller oil spills have already proven to have a great impact on ecosystems because of the remoteness of the site or the difficulty of an emergency environmental response. For example, in 1989 the Exxon Valdez oil tanker struck Prince William Sound's Bligh Reef in Alaska and spilled 260,000 to 750,000 barrels (41,000 to 119,000 m$^3$) of crude oil.

Oil spills at sea are generally much more damaging than those on land, since they can spread for hundreds of nautical miles in a thin oil slick which can cover beaches with a thin coating of oil. This can kill sea birds, mammals, shellfish and other organisms it coats.

The increasing number of marine oil spills calls for new and effective solutions for the environment.

To date, several approaches have been used to treat oil spills. These include, for example, the use of sponges made of pure carbon nanotubes, with a dash of boron atoms added, which can absorb oil up to 100 times of their weight (Daniel P. Hashim, et al., Covalently bonded three-dimensional carbon nanotube solids via boron induced nanojunctions. Scientific Reports 2, Article number: 363 doi:10.1038/srep00363, published 13 Apr. 2012); "metallic soaps", iron-rich salts, which use a unique blend of gravity and surface tension, and which can be vacuumed off the surface after cleaning an oily patch; the Elastec Oleophilic Skimmers which employ a grooved plastic disc that rotates through the water and which can pull as much as 2,500 gallons of oil from water per minute; and the absorbent peat moss which can absorb up to 15 times its weight in hydrocarbons.

Bioremediation, i.e., a process by which chemical materials are degraded by microorganisms, has become a major mechanism for removing and treating oil spills and pollutants on affected shorelines, in open water, near-shore, coastal environments and inland. Among the different techniques to enhance natural biodegradation by indigenous microorganisms, seeding of new bacteria and fertilizing the indigenous populations have attracted most interest. The application of nutrients such as nitrogen and phosphorus in the form of fertilizers has shown to be most effective in accelerating the biodegradation process and at the same time to be environmentally safe.

WO2008/041183 publication discloses microtubes and methods of generating same.

WO2009/104174 publication discloses a method of attaching a cell-of-interest to a microtube.

SUMMARY OF THE INVENTION

According to an aspect of some embodiments of the present invention there is provided a method of petroleum sequestration, the method comprising contacting a water source which comprises the petroleum with an electrospun microtube capable of sequestering the petroleum from the water, wherein the electrospun microtube does not comprise bacteria incorporated therein.

According to an aspect of some embodiments of the present invention there is provided a method of depleting petroleum from water, comprising:

(a) applying an electrospun microtube to the water, wherein the applying is effected for a predetermined time selected capable of adsorbing the petroleum from the water, and;

(b) removing the electrospun microtube from the water following the predetermined time, thereby depleting the petroleum from the water.

According to an aspect of some embodiments of the present invention there is provided a floating device comprising an electrospun microtube at least partially attached to a carrier, the carrier being capable of floating on water for at least one hour.

According to some embodiments of the invention, the electrospun microtube is at least partially attached to a floating carrier.

According to some embodiments of the invention, the electrospun microtube comprises an electrospun shell and an electrospun coat over an internal surface of the shell.

According to some embodiments of the invention, the electrospun microtube comprises a shell which comprises poly (vinylidene fluoride-co-hexafluoropropylene) (PVDF-HFP) and a coat over an internal surface of the shell which comprises poly vinyl pyrrolidone (PVP).

According to some embodiments of the invention, the electrospun microtube further comprises a bacterium capable of degrading petroleum.

According to some embodiments of the invention, the electrospun microtube is devoid of a bacterium.

According to some embodiments of the invention, the bacterium is encapsulated within the electrospun microtube.

According to some embodiments of the invention, applying is effected for a predetermined time selected capable of degrading the petroleum from the electrospun microtube.

According to some embodiments of the invention, applying is effected until at least 80% of the surface area of the electrospun microtube is devoid of the petroleum.

According to some embodiments of the invention, the method further comprising: (c) subjecting the electrospun microtube to bioremediation using a bacterium capable of degrading petroleum.

According to some embodiments of the invention, subjecting results in immobilization of the bacterium to the electrospun microtube.

According to some embodiments of the invention, the immobilization is to the surface of the electrospun microtube.

According to some embodiments of the invention, subjecting is effected by submersing at least a portion of the electrospun microtube in a solution which comprises the bacterium.

According to some embodiments of the invention, submersing is effected until at least 80% of the surface area of the electrospun microtube is devoid of the petroleum.

According to some embodiments of the invention, the electrospun microtube is produced by a method which comprises co-electrospinning two polymeric solutions through co-axial capillaries, wherein a first polymeric solution of the two polymeric solutions is for forming a shell of the microtube and a second polymeric solution of the two polymeric solutions is for forming a coat over an internal surface of the shell, the first polymeric solution is selected solidifying faster than the second polymeric solution and a solvent of the second polymeric solution is selected incapable of dissolving the first polymeric solution and wherein the second polymeric solution comprises a bacterium capable of degrading petroleum.

According to some embodiments of the invention, the shell comprises a polymer selected from the group consisting of poly (e-caprolactone) (PCL), polyamide, poly(siloxane), poly(silicone), poly(ethylene), poly(2-hydroxy ethylmethacrylate), poly(methyl methacrylate), poly(vinyl acetate), polyacrylamide, poly(ethylene-co-vinyl acetate), poly(methacrylic acid), polylactide, polyglycolide, poly(lactide-coglycolide), polyanhydride, polyorthoester, poly(carbonate), poly(acrylo nitrile), polyaniline, polyvinyl carbazole, polystyrene, poly(vinyl phenol), polyhydroxyacid, poly(caprolactone), polyanhydride, polyhydroxyalkanoate, polyurethane, collagen, chitosan, starch, and whereas the electrospun coat comprises a polymer selected from the group consisting of poly(acrylic acid), poly(vinyl acetate), polyacrylamide, poly(ethylene-co-vinyl acetate), poly(ethylene glycol), poly(methacrylic acid), polylactide polyglycolide, poly(lactide-coglycolide), polyanhydride, polyorthoester, poly(carbonate), poly(ethylene oxide), polyaniline, polyvinyl carbazole, polystyrene, poly(vinyl phenol), polyhydroxyacid, alginate, starch, and hyaluronic acid.

According to some embodiments of the invention, the shell further comprises a water soluble polymer selected from the group consisting of: poly(vinyl pyrrolidone), poly (N-vinyl pyrrolidone), poly(vinyl alcohol), poly(acrylic acid), poly(ethylene glycol), poly(ethylene oxide), albumin, alginate, and hyaluronic acid.

According to some embodiments of the invention, the water soluble polymer forms a polymer blend with the shell polymer. The shell comprises a polymer selected from the group consisting of poly(e-caprolactone) (PCL), polyamide, poly(siloxane), poly(silicone), poly(ethylene), poly(2-hydroxy ethylmethacrylate), poly(methyl methacrylate), poly (vinyl acetate), polyacrylamide, poly(ethylene-co-vinyl acetate), poly(methacrylic acid), polylactide, polyglycolide, poly(lactide-coglycolide), polyanhydride, polyorthoester, poly(carbonate), poly(acrylo nitrile), polyaniline, polyvinyl carbazole, polystyrene, poly(vinyl phenol), polyhydroxyacid, poly(caprolactone), polyanhydride, polyhydroxyalkanoate, polyurethane, collagen, chitosan, starch and whereas said electrospun coat comprises a polymer selected from the group consisting of poly(acrylic acid), poly(vinyl acetate), polyacrylamide, poly(ethylene-co-vinvl acetate), poly(ethylene glycol), poly(methacrylic acid), polylactide polyglycolide, poly(lactide-coglycolide), polyanhydride, polyorthoester, poly(carbonate), poly(ethylene oxide), polyaniline, polyvinyl carbazole, polystyrene, poly(vinyl phenol), polyhydroxyacid, alginate, starch, and hyaluronic acid and/or wherein said shell further comprises a water soluble polymer selected from the group consisting of: poly(vinyl pyrrolidone), poly(N-vinyl pyrrolidone), poly (vinyl alcohol), poly(acrylic acid), poly(ethylene glycol), poly(ethylene oxide), albumin, alginate, and hyaluronic acid.

According to some embodiments of the invention, the first and the second polymeric solutions are selected from the group consisting of: 10% poly (e-caprolactone) (PCL) in chloroform ($CHCl_3$) and dimethylforamide (DMF) (80:20 by weight) as the first polymeric solution and 4% poly (ethylene oxide) (PEO) in water ($H_2O$) and ethanol (60:40 by weight) as the second polymeric solution, 10% PCL in $CHCl_3$ and DMF (80:20 by weight) as the first polymeric solution and 6% PEO in $H_2O$ and ethanol (60:40 by weight) as the second polymeric solution, 9% PCL in $CHCl_3$ and DMF (90:10 by weight) as the first polymeric solution and 7% PEO in $H_2O$ as the second polymeric solution, 10% PCL in $CHCl_3$ and DMF (80:20 by weight) as the first polymeric solution and 9% poly(vinyl alcohol) (PVA) in water and ethanol (50:50 by weight) as the second polymeric solution, and 10% PCL in $CHCl_3$ and DMF (90:10 by weight) as the first polymeric solution and 4% (by weight) PEO in ethanol: $H_2O$ (26:74 by weight) as a second polymeric solution.

According to some embodiments of the invention, the petroleum comprises a petroleum hydrocarbon.

According to some embodiments of the invention, the petroleum comprises an aliphatic molecule and/or an aromatic molecule.

According to some embodiments of the invention, the bacterium utilizes alkanes as a sole source of carbon and energy.

According to some embodiments of the invention, the bacterium comprises *pseudomonas* st.

According to some embodiments of the invention, the carrier comprises a net substrate with a planar shape.

According to some embodiments of the invention, the carrier comprises a cylindrical carrier.

According to some embodiments of the invention, the carrier comprises a net substrate with a planar shape.

According to some embodiments of the invention, the carrier comprises a cylindrical carrier.

According to some embodiments of the invention, the electrospun microtube is devoid of bacterium.

According to some embodiments of the invention, the electrospun microtube comprises a bacterium capable of degrading petroleum.

According to some embodiments of the invention, a width of the carrier is at least 10 centimeters.

According to some embodiments of the invention, a diameter of the cylindrical carrier is at least one centimeter.

According to some embodiments of the invention, the electrospun microtubes are used as chopped hollow fibers which are distributed to the water in order to sequester petroleum.

According to some embodiments of the invention, the electrospun microtubes are used as fiber cocoons which are distributed to the water in order to sequester petroleum.

According to some embodiments of the invention, the electrospun microtubes are used as sawdust electrospun elements which are distributed to the water in order to sequester petroleum.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-B are images depicting the floating device of some embodiments of the invention. FIG. 1A—A black plastic cylindrical carrier wrapped by rope of fibers. Scale bar: 40 mm. FIG. 1B—sheet of fibers deposited on a plastic net substrate placed in a water bath.

FIGS. 3A-I are images depicting clearance of oil contamination using the devices of some embodiments of the invention. FIGS. 3A-C—electrospun microtubes without any addition of bacteria (i.e., being devoid of bacteria) attached to planar sheets (net substrates); FIGS. 3D-F—Electrospun microtubes encapsulating the *pseudomonas* st. bacteria wrapped as a rope over cylindrical plastics carriers. FIGS. 3G-I—Electrospun microtubes encapsulating the *pseudomonas* st. #52 bacteria collected as sheets over a plastic net substrate. Shown are sequential photographs of adsorption and/or degradation of crude oil using the various systems, from time 0 (at the moment of the introduction of the oil spill; FIGS. 3A, 3D and 3G); following 24 hours of treatment with the electrospun systems (FIGS. 3B, 3E and 3H), and following 72 hours of treatment with the electrospun systems (FIGS. 3C, 3F and 3I). Note the drastic clearance of oil following 24 and 72 hours using the electrospun microtubes with the *pseudomonas* st. bacteria. Also note the significant adsorption of petroleum to the electrospun microtubes sheets which are devoid of the bacteria (FIGS. 3B and 3C).

FIGS. 4A-B are images depicting clearance of oil spills from sea water using the device of some embodiments of the invention. Electrospun microtubes attached to substrate nets with (FIG. 4B) or without (FIG. 4A) bacteria were incubated 3 days in sea water contaminated by crude oil spill (as described in with respect to FIGS. 3A-I above). Shown are the microtubes after 3 days incubation with contaminated sea water without bacteria in the fibers (FIG. 4A), or with bacteria in the fibers (FIG. 4B). Note that in the presence of bacteria in the electrospun microtubes, the degradation of the crude oil is completed and therefore the sheet is clean as well. Note that in the absence of the bacteria, the electrospun microtubes adsorb the crude oil to the microtube and therefore the sheet is stained by adsorbed crude oil.

FIG. 5A—water and crude oil without any bacteria and without electrospun microtubes; FIG. 5B—water and crude oil with bacteria (in suspension) without the electrospun microtubes; FIG. 5C—water and crude oil with electrospun microtubes on cylindrical carriers, wherein the electrospun microtubes encapsulate the bacteria therein. In the experiments of FIGS. 5B and 5C, the bacterium used was *pseudomonas* st. #52.

FIG. 6A—shown are the measured crude oil (petroleum) concentration measured as part per million (ppm) that were remained in solution after 7 days from initial exposure to the crude oil; FIG. 6B—shown are the percentage of crude oil degradation after 7 days measured as a ratio of the initial crude oil present in each system;

FIGS. 7A-F are images of electrospun microtubes mats attached on horizontal (planar) net substrates. The electrospun microtubes mats (sheets) were placed on sea water contaminated with petroleum in order to detect sequestration or depletion of the petroleum from the water. In this experiment, the electrospun microtubes did not include any bacteria encapsulated or attached thereto. In each treatment batch, one liter of sea water which included 3 ml of crude oil was used. In the second batch, the electrospun microtubes mats (sheets) which were already used in the first batch to adsorb the petroleum were further placed in a bath containing contaminated sea water (one liter of sea water with 3 ml of petroleum). The area of each electrospun microtubes mat was 230 cm².

FIGS. 8A-D are schematic illustrations of some embodiments of the device of the invention. FIG. 8A—Device 120 comprises carrier 100 having a planar geometry (planar shape) and electrospun microtube 110 at least partially attached to carrier 100. FIG. 8B—Device 130 comprises carrier 100 having a planar geometry (planar shape) and electrospun microtube 110 in a form of electrospun microtube mat (sheet) at least partially attached to carrier 100. FIG. 8C—Device 160 comprises carrier 100 having a planar geometry (planar shape) and electrospun microtube 110 at least partially attached to carrier 100. Carrier 100 comprises holes (pores) which enable fluid communication between the water (e.g., with the petroleum) and electrospun microtube 110. FIG. 8D—Device 170 comprises carrier 100 having a planar geometry (planar shape) and electrospun microtube 110 in a form of electrospun microtube mat (sheet) at least partially attached to carrier 100. Carrier 100 comprises holes (pores) which enable fluid communication between the water (e.g., with the petroleum) and electrospun microtube 110.

FIG. 9A—Device 140 comprises carrier 100 having a cylindrical shape and electrospun microtube 110 wrapping around carrier 100. FIG. 9B—Device 150 comprises carrier 100 having a cylindrical shape and electrospun microtube 110 in a form of electrospun microtube mat (sheet) wrapping around carrier 100. FIG. 9C—Device 180 comprises carrier 100 having a cylindrical shape and electrospun microtube 110 wrapping around carrier 100. Carrier 100 comprises holes (pores)

which enable fluid communication between the water (e.g., with the petroleum) and electrospun microtube 110. FIG. 9D—Device 190 comprises carrier 100 having a cylindrical shape and electrospun microtube 110 in a form of electrospun microtube mat (sheet) wrapping around carrier 100. Carrier 100 comprises holes (pores) which enable fluid communication between the water (e.g., with the petroleum) and electrospun microtube 110.

DESCRIPTION OF SPECIFIC EMBODIMENTS OF THE INVENTION

Figure 2:
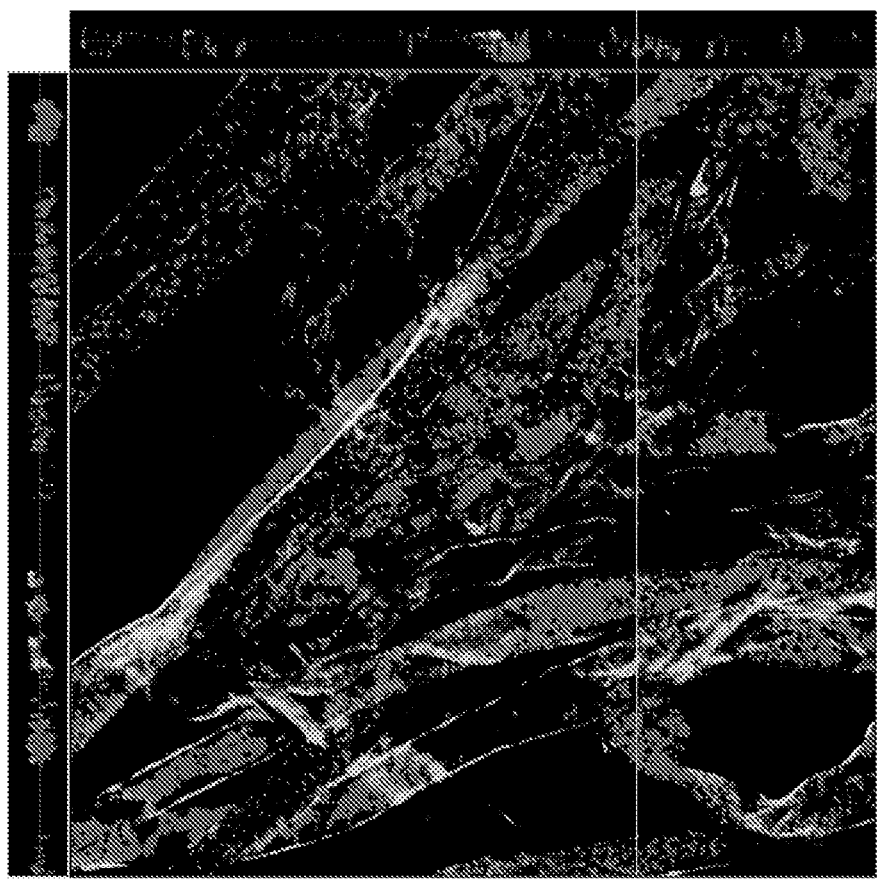
FIG. 2 is a confocal microscope micrograph of encapsulated #52 bacteria within electrospun microtubes after the post-spinning recovery process.

The present invention, in some embodiments thereof, relates to methods and devices for sequestration and/or depletion of petroleum from water, and, more particularly, but not exclusively, to the use of electrospun microtubes for adsorption and/or sequestration of petroleum from the water, and optionally for further bioremediation of petroleum using the electrospun microtubes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have uncovered that an electrospun microtube can be used to sequester and/or adsorb crude petroleum from water, and thus can be used for treating crude oil spills and other petroleum contaminations. Thus, as shown in Example 1 of the Examples section which follows, the present inventors have prepared devices for sequestration of petroleum which comprise floating carriers and electrospun microtubes (FIGS. 1A-B), and used these devices for adsorption of petroleum (Example 2 of the Examples section which follows, FIGS. 7A-F). In addition, encapsulation of bacterium, which is capable of degrading petroleum, within the electrospun microtubes resulted in bioremediation and almost a complete clearance of the petroleum from the electrospun microtubes mats that adsorbed the petroleum (FIGS. 3A-I, 4A-B, Example 3 of the Examples section which follows). Moreover, the device of some embodiments of the invention was found to be superior than using free suspensions of the petroleum-degrading bacteria (FIGS. 5A-C and 6A-B, Example 4 of the Examples section which follows). Altogether, these results show that the device of some embodiments of the invention can be used for efficient sequestration and optionally also bioremediation of petroleum, and that the electrospun microtubes of some embodiments of the invention can be used for treating marine oil spills, by adsorption and/or bioremediation.

According to an aspect of some embodiments of the invention, there is provided a method of petroleum sequestration, the method comprising contacting a water source which comprises the petroleum with an electrospun microtube capable of sequestering the petroleum from the water, wherein the electrospun microtube does not comprise bacteria incorporated therein.

As used herein the phrase "petroleum sequestration" refers to the capture and/or separation of the petroleum from its environment, e.g., from an aqueous solution comprising same.

According to some embodiments of the invention, the sequestration of the petroleum is effected by adsorption of the petroleum onto the electrospun microtube.

As used herein the phrase "electrospun microtube" relates to a microtube formed by the process of electrospinning.

According to some embodiments of the invention the electrospun microtube comprises an electrospun shell and an electrospun coat over an internal surface of the shell.

As used herein, the phrase "electrospun shell" refers to a hollow element of a tubular shape, made of one or more polymers, produced by the process of electrospinning as detailed below.

As used herein the phrase "electrospun coat" refers to a thin layer covering the internal surface of the shell of the microtube of the invention which is made of one or more polymers by the process of electrospinning as detailed below.

One of ordinary skill in the art will know how to distinguish an electrospun object from objects made by means which do not comprise electrospinning by the high orientation of the macromolecules, the skin (e.g., shell) morphology, and the typical dimensions of the microtube which are unique to electrospinning.

As used herein the term "microtube" refers to a hollow tube having an inner diameter from about 50 nm to about 50 µm and an outer diameter from about 0.5 µm to about 100 µm.

According to some embodiments of the invention the inner diameter of the microtube shell of the invention can vary from about 100 nm to about 20 µm, e.g., from about 200 nm to about 10 µm, e.g., from about 500 nm to about 5 µm, e.g., from about 1 µm to about 5 µm, e.g., about 3 µm.

According to some embodiments of the invention the thickness of the microtube shell of the invention can vary from a few nanometers to several micrometers, such as from about 100 nm to about 20 µm, e.g., from about 200 nm to about 10 µm, from about 100 nm to about 5 µm, from about 100 nm to about 1 µm, e.g., about 500 nm.

According to some embodiments of the invention, the microtube may have a length which is from about 0.1 millimeter (mm) to about 20 centimeter (cm), e.g., from about 1-20 cm, e.g., from about 5-10 cm.

According to some embodiments of the invention, the length (L) of the electrospun microtube of some embodiments of the invention can be several orders of magnitude higher (e.g., 10 times, 100 times, 1000 times, 10,000 times, e.g., 50,000 times) than the microtube's diameter (D).

As used herein the phrase "co-electrospinning" refers to a process in which at least two polymeric solutions are electrospun from co-axial capillaries (i.e., at least two capillary dispensers wherein one capillary is placed within the other capillary while sharing a co-axial orientation) forming the spinneret within an electrostatic field in a direction of a collector. The capillary can be, for example, a syringe with a metal needle or a bath provided with one or more capillary apertures from which the polymeric solution can be extruded, e.g., under the action of hydrostatic pressure, mechanical pressure, air pressure and/or high voltage.

The collector serves for collecting the electrospun element (e.g., the electrospun microtube) thereupon. Such a collector can be a rotating collector or a static (non-rotating) collector. When a rotating collector is used, such a collector may have a cylindrical shape (e.g., a drum), however, the rotating collector can be also of a planar geometry (e.g., a horizontal disk). The spinneret is typically connected to a source of high voltage, such as of positive polarity, while the collector is grounded, thus forming an electrostatic field between the dispensing capillary (dispenser) and the collector. Alternatively, the spinneret can be grounded while the collector is connected to a source of high voltage, such as with negative polarity. As will be appreciated by one ordinarily skilled in the art, any of the above configurations establishes motion of a positively charged jet from the spinneret to the collector. Reverse polarity for establishing motions of a negatively charged jet from the spinneret to the collector are also contemplated.

For electrospinning, the first polymeric solution is injected into the outer capillary of the co-axial capillaries while the second polymeric solution is injected into the inner capillary of the co-axial capillaries. In order to form a microtube (i.e., a hollow structure, as mentioned above), the first polymeric solution (which is for forming the shell of the microtube) solidifies faster than the second polymeric solution (also referred herein as a core polymeric solution, and is for forming a coat over the internal surface of the shell). In addition, the formation of a microtube also requires that the solvent of the second polymeric solution be incapable of dissolving the first polymeric solution.

The solidification rates of the first and second polymeric solutions are critical for forming the microtube. For example, for a microtube of about 100 μm, the solidification of the first polymer (of the first polymeric solution) can be within about 30 milliseconds (ms) while the solidification of the second polymer (of the second polymeric solution) can be within about 10-20 seconds. The solidification may be a result of polymerization rate and/or evaporation rate.

According to some embodiments of the invention, the solvent of the first polymeric solution evaporates faster than the solvent of second polymeric solution (e.g., the solvent of the first polymeric solution exhibits a higher vapor pressure than the solvent of the second polymeric solution).

According to some embodiments of the invention, the rate of evaporation of the solvent of the first polymeric solution is at least about 10 times faster than that of the solvent of the second polymeric solution. The evaporation rate of the solvent of the first polymeric solution can be at least about 100 times faster or at least about 1000 times faster than the evaporation rate of the solvent of second polymeric solution. For example, the evaporation of chloroform is significantly faster than the evaporation of an aqueous solution (water) due to the high vapor pressure at room temperature of the chloroform (195 mmHg) vs. that of the aqueous solution (23.8 mmHg).

When selecting a solvent of the second polymeric solution which is incapable of dissolving the first polymeric solution (i.e., a non-solvent of the first polymeric solution), the polymer of the first polymeric solution can solidify (e.g., through precipitation) and form a strong microtube shell which does not collapse, and which is characterized by an even thickness. According to some embodiments of the invention, the first polymeric solution (e.g., the solvent of the first polymer) is substantially immiscible in the solvent of the second polymeric solution.

The solvent of the second polymeric solution may evaporate while the polymer (of the second polymeric solution) forms a thin layer on the internal surface of the shell.

According to some embodiments of the invention, the solvent of the second polymeric solution is capable of evaporating through the internal surface of the shell.

The flow rates of the first and second polymeric solutions can determine the microtube outer and inner diameter and thickness of shell. Non-limiting examples are shown in Table 1 hereinbelow.

TABLE 1

Effect of the flow rates of the two polymeric solutions during electrospinning on microtube diameter and thickness of shell

| System No. | System: First polymeric solution/ Second polymeric solution | Flow rates (ml/hr) | R Outer Fiber radius (μm) | d Shell thickness (μm) | V Voltage (kV) | Electrostatic field kV/cm |
|---|---|---|---|---|---|---|
| M5 | First polymeric solution | 4 | 3.0-4.5 | 0.5 ± 0.1 | 8.5 | 0.43 |
|  | Second polymeric solution | 0.5 |  |  |  |  |
| M10 | First polymeric solution | 10 | 2.3-4.0 | 1.0 ± 0.1 | 8 | 0.5 |
|  | Second polymeric solution | 0.3 |  |  |  |  |
| M11 | First polymeric solution | 10 | 3-6 | 1.0 ± 0.1 | 9 | 0.56 |
|  | Second polymeric solution | 2 |  |  |  |  |

Table 1: Electrospinning was performed with the following solutions: First polymeric solution (for forming the shell) was 10% PCL in CHCl$_3$/DMF (8:2 weight/weight); second polymeric solution (for forming the coat) was 4% PEO in H$_2$O/EtOH (6:4, weight/weight). PCL 80K; PEO 600K. The temperature during electrospinning was of 22-26° C. The relative humidity was 58%, 52% and 53% for systems M5, M10 and M11, respectively. The flow rates were measured in milliliter per hour (ml/hr); the outer microtube radius and the shell thickness were measured in microns (μm). The resulting tubes were hollow (good tubes in systems M5 and M11, and mostly good in system M10).

As used herein the phrase "polymeric solution" refers to a soluble polymer, i.e., a liquid medium containing one or more polymers, co-polymers or blends of polymers dissolved in a solvent. The polymer used by the invention can be a natural, synthetic, biocompatible and/or biodegradable polymer.

The phrase "synthetic polymer" refers to polymers that are not found in nature, even if the polymers are made from naturally occurring biomaterials. Examples include, but are not limited to, aliphatic polyesters, poly(amino acids), copoly(ether-esters), polyalkylenes, oxalates, polyamides, tyrosine derived polycarbonates, poly(iminocarbonates), polyorthoesters, polyoxaesters, polyamidoesters, polyoxaesters containing amine groups, poly(anhydrides), polyphosphazenes, and combinations thereof.

Suitable synthetic polymers for use by the invention can also include biosynthetic polymers based on sequences found in naturally occurring proteins such as those of collagen, elastin, thrombin, fibronectin, or mutant or synthetic derivatives thereof or, starches, poly(amino acids), poly(propylene fumarate), gelatin, alginate, pectin, fibrin, oxidized cellulose, chitin, chitosan, tropoelastin, hyaluronic acid, polyethylene, polyethylene terephthalate, poly(tetrafluoroethylene), polycarbonate, polypropylene and poly(vinyl alcohol), ribonucleic acids, deoxyribonucleic acids, polypeptides, proteins, polysaccharides, polynucleotides and combinations thereof.

The phrase "natural polymer" refers to polymers that are naturally occurring. Non-limiting examples of such polymers include, silk, collagen-based materials, chitosan, hyaluronic acid, albumin, fibrinogen, and alginate.

As used herein, the phrase "co-polymer" refers to a polymer of at least two chemically distinct monomers. Non-limiting examples of co-polymers include, polylactic acid (PLA)-polyethyleneglycol (PEG), polyethylene glycol terephthalate (PEGT)/polybutylene terephthalate (PBT), PLA-polyglycolic acid (PGA), PEG-polycaprolactone (PCL) and PCL-PLA.

As used herein, the phrase "blends of polymers" refers to the result of mixing two or more polymers together to create a new material with different physical properties.

The phrase "biocompatible polymer" refers to any polymer (synthetic or natural) which when in contact with cells, tissues or body fluid of an organism does not induce adverse effects such as immunological reactions and/or rejections, cellular death, and the like. A biocompatible polymer can also be a biodegradable polymer.

According to some embodiments of the invention, the first and the second polymeric solutions are biocompatible.

Non-limiting examples of biocompatible polymers include polyesters (PE), PCL, calcium sulfate, PLA, PGA, PEG, polyvinyl alcohol, polyvinyl pyrrolidone, polytetrafluoroethylene (PTFE, teflon), polypropylene (PP), polyvinylchloride (PVC), polymethylmethacrylate (PMMA), polyamides, segmented polyurethane, polycarbonate-urethane and thermoplastic polyether urethane, silicone-polyether-urethane, silicone-polycarbonate-urethane collagen, PEG-DMA, alginate, hydroxyapatite and chitosan, blends and copolymers thereof.

The phrase "biodegradable polymer" refers to a synthetic or natural polymer which can be degraded (i.e., broken down) in a physiological environment such as by proteases or other enzymes produced by living organisms such as bacteria, fungi, plants and animals. Biodegradability depends on the availability of degradation substrates (i.e., biological materials or portion thereof which are part of the polymer), the presence of biodegrading materials (e.g., microorganisms, enzymes, proteins) and the availability of oxygen (for aerobic organisms, microorganisms or portions thereof), lack of oxygen (for anaerobic organisms, microorganisms or portions thereof) and/or other nutrients. Examples of biodegradable polymers/materials include, but are not limited to, collagen (e.g., collagen I or IV), fibrin, hyaluronic acid, polylactic acid (PLA), polyglycolic acid (PGA), polycaprolactone (PCL), polydioxanone (PDO), trimethylene carbonate (TMC), polyethyleneglycol (PEG), collagen, PEG-DMA, alginate, chitosan copolymers or mixtures thereof.

According to some embodiments, the polymeric solution can be made of one or more polymers, each can be a polymer or a co-polymer such as described hereinabove.

According to some embodiments of the invention, the polymeric solution is a mixture of at least one biocompatible polymer and a co-polymer (either biodegradable or non-biodegradable).

According to some embodiments of the invention, the first polymeric solution for forming the shell can be made of a polymer such as poly (e-caprolactone) (PCL), polyamide, poly(siloxane), poly(silicone), poly(ethylene), poly(2-hydroxy ethylmethacrylate), poly(methyl methacrylate), poly (vinyl acetate), polyacrylamide, poly(ethylene-co-vinyl acetate), poly(methacrylic acid), polylactide, polyglycolide, poly(lactide-coglycolide), polyanhydride, polyorthoester, poly(carbonate), poly(acrylo nitrile), polyaniline, polyvinyl carbazole, polystyrene, poly(vinyl phenol), polyhydroxyacid, poly(caprolactone), polyanhydride, polyhydroxyalkanoate, polyurethane, collagen, chitosan, starch, and blends and copolymers thereof.

According to some embodiments of the invention, the shell polymer is water insoluble.

According to some embodiments of the invention, the shell further comprises a water soluble polymer such as poly(vinyl pyrrolidone), poly(N-vinyl pyrrolidone), poly (vinyl alcohol), poly(acrylic acid), poly(ethylene glycol), poly(ethylene oxide), albumin, alginate, and hyaluronic acid.

According to some embodiments of the invention, the water soluble polymer forms a polymer blend with the water insoluble shell polymer.

According to some embodiments of the invention, the water soluble polymer forms a co-polymer with the water insoluble shell polymer, and the formed co-polymer is mainly water insoluble.

According to some embodiments of the invention, the second polymeric solution for forming the coat over the internal surface of the shell can be made of a polymer such as poly(acrylic acid), poly(vinyl acetate), polyacrylamide, poly(ethylene-co-vinyl acetate), poly(ethylene glycol), poly (methacrylic acid), polylactide polyglycolide, poly(lactide-coglycolide), polyanhydride, polyorthoester, poly(carbonate), poly(ethylene oxide), polyaniline, polyvinyl carbazole, polystyrene, poly(vinyl phenol), polyhydroxyacid, alginate, starch, hyaluronic acid, and blends and copolymers thereof.

During the formation of the microtube shell (e.g., following the solidification of the first polymeric solution) the second polymeric solution flows within the internal surface of the shell.

According to some embodiments of the invention, the second polymeric solution is selected capable of wetting the internal surface of the shell.

Various polymeric solutions are capable of wetting other polymeric surfaces (for forming the shell). Following is a non-limiting list of pairs of polymeric solutions in which the second polymeric solution is capable of wetting the internal surface of the shell formed by the first polymeric solution.

Following is a non-limiting list of first and second polymeric solutions for preparation of the microtube of some embodiments of the invention.

TABLE 2

Pairs of polymeric solutions for producing the microtube of some embodiments of the invention

| First polymeric solution forming the shell | Second polymeric solution capable of wetting the internal surface of the shell |
| --- | --- |
| 10% poly (e-caprolactone) (PCL); in chloroform (CHCl$_3$) and dimethylforamide (DMF) (80:20 by weight) | 4% poly(ethylene oxide) (PEO); in water (H$_2$O) and ethanol (60:40 by weight) |
| Nylon 6, 6 in formic acid 7 to 12 wt % | 4% poly(ethylene oxide) (PEO); in water (H$_2$O) and ethanol (60:40 by weight) |
| Poly(L-lactide-co-glycolide) (PLGA 10:90) in hexafluroisopropanol (HFIP) concentrations ranging from 2 to 7 weight % solution. | 4% poly(ethylene oxide) (PEO) in water (H$_2$O) and ethanol (60:40 by weight) |
| Poly(L-lactide-co-glycolide) (PLGA 15:85) hexafluroisopropanol (HFIP) concentrations ranging from 2 to 7 weight % solution. | 4% poly(ethylene oxide) (PEO); in water (H$_2$O) and ethanol (60:40 by weight) |
| poly(lactide-co-glycolide) (PLGA; l-lactide/glycolide _ 50/50) 1,1,1,3,3,3-hexafluoro-2-propanol (HFIP) concentrations ranging from 2 to 7 weight % solution. | 4% poly(ethylene oxide) (PEO); in water (H$_2$O) and ethanol (60:40 by weight) |
| polyglycolide (PGA) in chloroform 3-10 weight % solution. | 9% poly(vinyl alcohol) (PVA); in water and ethanol (50:50 by weight) |
| poly(L-lactide) (PLA) in chloroform 3-10 weight % solution. | 9% poly(vinyl alcohol) (PVA); in water and ethanol (50:50 by weight) |

TABLE 2-continued

Pairs of polymeric solutions for producing the microtube of some embodiments of the invention

| First polymeric solution forming the shell | Second polymeric solution capable of wetting the internal surface of the shell |
|---|---|
| Segmented polyurethane in DMF and THF (80:20 by weight) | 9% poly(vinyl alcohol) (PVA); in water and ethanol (50:50 by weight) |
| Polyurethane in DMF and tetrahydrofuran, THF (80:20 by weight) | 9% poly(vinyl alcohol) (PVA); in water and ethanol (50:50 by weight) |
| PLGA (poly lactic-co-glycolic acid); in chloroform and DMSO (dimethyl sulfoxide) in chloroform and DMSO (80:20 by weight). | 9% poly(vinyl alcohol) (PVA); in water and ethanol (50:50 by weight) |
| 10% PCL in $CHCl_3$/DMF (80:20 by weight) | 6% PEO in $H_2O$/EtOH (60:40 by weight) |
| 9% PCL in $CHCl_3$/DMSO (90:10 by weight) | 7% PEO in $H_2O$ |
| 10% PCL in $CHCl_3$/DMF (80:20 by weight) | 9% PVA in ethanol/water (50:50 by weight) |
| 10% PCL 80K $CHCl_3$:DMF (90:10 by weight) | 4% (w/w) PEO 600K; in ethanol:$H_2O$ (26:74 by weight) |
| 10% PCL 80K + 1% PEG 6K $CHCl_3$:DMF (90:10 by weight) | 4% (w/w) PEO 600K; in ethanol:$H_2O$ (26:74 by weight) |

Table 2 (cont.). The polymers forming the solutions and the solvents are provided by weight ratios, i.e., a weight/weight (w/w) ratio.

According to some embodiments of the invention, the first and the second polymeric solutions are selected from the group consisting of: 10% poly (e-caprolactone) (PCL) in chloroform ($CHCl_3$) and dimethylforamide (DMF) (80:20 by weight) as the first polymeric solution and 4% poly (ethylene oxide) (PEO) in water ($H_2O$) and ethanol (60:40 by weight) as the second polymeric solution, 10% PCL in $CHCl_3$ and DMF (80:20 by weight) as the first polymeric solution and 6% PEO in water and ethanol (60:40 by weight) as the second polymeric solution, 9% PCL in $CHCl_3$ and DMF (90:10 by weight) as the first polymeric solution and 7% PEO in water as the second polymeric solution, 10% PCL in $CHCl_3$ and DMF (80:20 by weight) as the first polymeric solution and 9% poly(vinyl alcohol) (PVA) in water and ethanol (50:50 by weight) as the second polymeric solution and 10% PCL in $CHCl_3$ and DMF (90:10 by weight) as the first polymeric solution and 4% (w/w) PEO in ethanol:water (26:74 by weight) as a second polymeric solution.

According to some embodiments of the invention, the electrospun microtube comprises a shell which comprises poly (vinylidene fluoride-co-hexafluoropropylene) (PVDF-HFP) and a coat over an internal surface of the shell which comprises poly vinyl pyrrolidone (PVP).

The microtube of the invention can form an individual (e.g., single or separated) microtube or can form part of a plurality (e.g., an aligned array) of microtubes which can be either connected to each other or separated (as single, not-connected microtubes).

For the production of a single microtube a fork like clip is attached to the edge of the rotating disk. The disk is rotated for 1-2 seconds and individual microtubes are formed between the sides of the clip. In a similar way individual electrospun fibers were collected [see E. Zussman, M. Burman, A. L. Yarin, R. Khalfin, Y. Cohen, "Tensile Deformation of Electrospun Nylon 6,6 Nanofibers," *Journal of Polymer Science Part B: Polymer Physics*, 44, 1482-1489, (2006), herein incorporated by reference in its entirety].

Alternatively, when using a rotating collector, a plurality of microtubes can be formed and collected on the edge of the collector as described elsewhere for electrospun fibers [A. Theron, E. Zussman, A. L. Yarin, "Electrostatic field-assisted alignment of electrospun nanofibers", *Nanotechnology J.*, 12, 3: 384-390, (2001); herein incorporated by reference in its entirety].

The plurality of microtubes can be arranged on a single layer, or alternatively, the plurality of microtubes define a plurality of layers hence form a three dimensional structure. The microtubes can have a general random orientation, or a preferred orientation, as desired. For example, when the fibers are collected on a cylindrical collector such as a drum, the microtubes can be aligned predominantly axially or predominantly circumferentially. Different layers of the electrospun microtubes can have different orientation characteristics. For example, without limiting the scope of the present invention to any specific ordering or number of layers, the microtubes of a first layer can have a first predominant orientation, the microtubes of a second layer can have a second predominant orientation, and the microtubes of third layer can have general random orientation.

The microtube of the invention can be available as a dry fibrous mat(s) (e.g., as spun dry microtubes) or as a wetted mat(s) (e.g., following immersing or filling the microtube with a liquid).

According to some embodiments of the invention, the microtube is configured as or in a microfluidics device. "Lab-on-a-chip" is described in a series of review articles [see for example, Craighead, H. "Future lab-on-a-chip technologies for interrogating individual molecules". Nature 442, 387-393 (2006); deMello, A. J. "Control and detection of chemical reactions in microfluidic systems". Nature 442, 394-402 (2006); El-Ali, J., Sorger, P. K. & Jensen, K. F. "Cells on chips". Nature 442, 403-411 (2006); Janasek, D., Franzke, J. & Manz, A. "Scaling and the design of miniaturized chemical-analysis systems". Nature 442, 374-380 (2006); Psaltis, D., Quake, S. R. & Yang, C. H. "Developing optofluidic technology through the fusion of microfluidics and optics". Nature 442, 381-386 (2006); Whitesides, G. M. "The origins and the future of microfluidics". Nature 442, 368-373 (2006); Yager, P. et al. "Microfluidic diagnostic technologies for global public health". Nature 442, 412-418 (2006)] each of which is fully incorporated herein by reference].

According to some embodiments of the invention, the electrospun microtube of some embodiments of the invention can be filled with a liquid.

To enable a flow of a liquid-of-interest within the microtube, i.e., along the coat polymer covering the internal surface of the shell (which originates from the second polymer solution), the surface (thin film) formed by the coat polymer should be designed such that it can be wetted by the liquid-of-interest. The ability to wet (wettability) polymer films by liquids is known in the art. For example, silicone oil or water can wet a surface made of a PEO polymer. The wettability of the coat polymer covering the internal surface of the shell can be controlled (e.g., improved) for example by attaching (e.g., using plasma treatment) functional groups such as hydroxyl groups (OH) which increase the hydrophilicity of the coat [see Thurston R M, Clay J D, Schulte M D, Effect of atmospheric plasma treatment on polymer surface energy and adhesion, Journal of Plastic Film & Sheeting 23 (1): 63-78 January 2007; which is incorporated within by reference].

The microtube shell may comprise pores, thus creating a "breathing" tube. Methods of forming "breathing" microtube (i.e., microtubes with pores in the shell thereof) are described in PCT/IB2007/054001 to Zussman E., et al., which is fully incorporated herein by reference. Briefly, "breathing" tubes can be formed by the inclusion of a high percent (e.g., at least 60%) of a volatile component such as tetrahydrofuran (THF), chloroform, acetone, or trifluoroethanol (TFE) in the first polymeric solution forming the shell, and/or by the inclusion of a water-soluble polymer such as polyethylene glycol (PEG) in the first polymeric solution forming the shell so that the first polymeric solution comprises a blend of polymers in which one is water-soluble and the other is water-insoluble (e.g., a blend of PEG and PCL). Alternatively, "breathing" microtubes can be formed by inducing pores in the shell after the completion of the electrospinning process, essentially as described in PCT WO 2006/106506 to the present inventors, which is fully incorporated herein by reference, such as by passing an electrical spark or a heated puncturing element through the electrospun shell, or by using a pulsed or continuous laser beam through the electrospun shell.

The microtube shell can be designed for selective passage of certain molecules or particles such as petroleum molecules. The passage through the shell pores depends on the size and/or the electrical charge of the molecules/particles with respect to the geometry (length and radius), surface energy, electrical charge of the shell pores, and the viscosity and surface tension of the liquid containing the molecules/particles.

It should be noted that by the process of electrospinning electrospun microtubes mats can be obtained having any shape or geometry, such as a planar geometry (e.g., as a mat or sheet made of electrospun microtubes) or a cylindrical geometry (e.g., as a rope surrounding a cylinder).

For example, the electrospun microtubes mats may have a thickness of about 50-1000 µm, e.g., about 60-900 µm, e.g., about 80-800 µm, e.g., about 90-700 µm, e.g., about 100-600 µm, e.g., about 200-500 µm, e.g., about 250-400 µm, e.g., 80-300 µm (microns), although additional ranges of thickness can be obtained by controlling the deposition time of the electrospun mats onto the collector.

According to some embodiments of the invention, the electrospun microtubes are used as chopped hollow fibers (short fibers of about 10-50 cm) which are distributed (scattered) to the water in order to sequester petroleum.

According to some embodiments of the invention, the electrospun microtubes are used as fiber cocoons which are distributed (scattered) to the water in order to sequester petroleum.

According to some embodiments of the invention, the electrospun microtubes are used as sawdust electrospun elements. It should be noted that sawdust electrospun elements can be prepared by cutting, grinding, drilling, sanding, or otherwise pulverizing electrospun microtubes with a saw or other tool.

According to some embodiments of the invention, the chopped hollow fibers, the fiber cocoons or the sawdust electrospun elements can be further removed from the water. Removal of the electrospun microtubes can be using physical tools such as a net.

According to some embodiments of the invention, the electrospun microtube is used as part of a floating device where the electrospun microtubes mats are at least partially attached to a floating carrier.

According to an aspect of some embodiments of the invention, there is provided a method of depleting petroleum from water, comprising:

(a) applying an electrospun microtube to the water, wherein the applying is effected for a predetermined time selected capable of adsorbing the petroleum from the water, (b) removing the electrospun microtube from the water following the predetermined time, thereby depleting the petroleum from the water.

As used herein the phrase "depleting" refers to removing an amount of the petroleum from a predetermined volume of water, e.g., at least about 1%, at least about 2%, at least about 3%, at least about 4%, at least about 5%, at least about 6%, at least about 7%, at least about 8%, at least about 9%, at least about 10%, at least about 15%, 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, e.g., 99%, e.g., 100% of the petroleum present in the predetermined volume of water by the electrospun microtubes of some embodiments of the invention.

Means of measuring presence and/or amount of petroleum in water are available and known in the art. For example total petroleum hydrocarbons (TPH) can be detected using infrared (IR) according to US EPA (United State Environmental Protection Agency) method 418.1, which is used for measurement of fluorocarbon-113 extractable petroleum hydrocarbons from surface and saline waters, industrial and domestic wastes. The measured parameters can be determined as parts per million (ppm) as shown for example in FIGS. 6A-B. Sequestration or depletion of the petroleum from the water can be calculated as a percentage of petroleum in the amount of treated water following treatment with the electrospun microtubes of some embodiments of the invention with respect to the initial amount of petroleum contamination in the same amount of water prior to treatment with the electrospun microtubes of some embodiments of the invention.

For example, as shown in FIGS. 7A-F, the electrospun microtubes of some embodiments of the invention were capable of adsorbing (and thus depleting from the water) the entire petroleum contamination from the water (i.e., 3 ml of crude oil from 1 liter of sea water), which is equivalent to removal of 3000 ppm of petroleum within one day of treatment.

It should be noted that since the electrospun microtubes adsorb the crude oil (petroleum) thereon, a higher surface area of the electrospun microtubes will increase the contact area with the contaminated water, and therefore will maximize the adsorption effect of the electrospun microtubes.

According to some embodiments of the invention, the electrospun microtube is at least partially attached to a floating carrier.

As used herein the phrase "at least partially attached" refers to an attachment which enables the carrier to preserve maximal surface area of the electrospun microtubes mats while in the water.

For example, when a carrier with a planar shape (geometry) is used, the electrospun microtubes mats are attached at least to the perimeter (edges) of the planar carrier, so as to keep the electrospun microtubes mats flat (e.g., not folded or collapsed) while in the water. The electrospun microtubes (the hollow fibers) are attached to the carrier via physical forces.

For example when a cylinder carrier is used, the electrospun microtubes can surround or wrap the cylinder such as shown in FIG. 1A and described in the Examples section which follows. Briefly, during electro-spinning the collector can be a rotating plastic cylindrical carrier such that the electrospun hollow fibers are collected as a rope wrapped around the cylindrical carrier.

As used herein the phrase "floating carrier" refers to any carrier capable of floating in water, such as in sea water.

According to some embodiments of the invention, the floating carrier is capable of floating (i.e., not sinking) on the water for at least about 1 hour, e.g., for at least about 2, 3, 4, 5, 6, 7, 8, 9, 10, 11, 12, 13, 14, 15, 16, 17, 18, 19, 20, 21, 22, 23 or 24 hours, e.g., for at least about 2, 3, 4, 5, 6, 7, 8, 9, 10 or more days, weeks or months.

The carrier is designed in a way to enable contact of the water/crude petroleum with the wrapped hollow fibers (electrospun microtubes) from every direction so to achieve the largest exposed surface area of the fibers.

According to some embodiments of the invention, the carrier comprises holes (or pores) which enable flow of water (e.g., water contaminated with petroleum) through the carrier into the electrospun microtubes which are in contact with or being attached to the carrier.

According to some embodiments of the invention, the carrier has a planar geometry. For example, a horizontal or planar net substrate can be made of plastics, with a dimension of up to few meters in width and unlimited length (e.g., as a roll). The length can be also controlled by attaching a few substrate nets which hold (or being attached to) the electrospun microtubes sheets one to the other in order to reach an unlimited length. The density (mesh size) of the carrier (e.g., a substrate net) can range from a few up to tens of centimeters.

According to some embodiments of the invention, the width of the carrier having a planar shape is at least 1, 2, 3, 4, 5, 6, 7, 8, 9, 10, 11, 12, 13, 14, 15, 16, 17, 18, 19, 20, 30, 40, 50, 60, 70, 80, 90, 100 centimeters, or at least about 2, 3, 4, 5, 6, 7, 8, 9, 10, 11, 12, 13, 14, 15, 16, 17, 18, 19, 20, 30, 40, 50, 60, 70, 80, 90 or more meters.

The cylindrical carrier may be formed from any material which when placed in water remains floating, e.g., plastic. The size of the plastic cylindrical carrier may vary between few millimeters or centimeters to tens of centimeters in both diameter and length.

According to some embodiments of the invention, the diameter of the cylindrical carrier is at least 1, 2, 3, 4, 5, 6, 7, 8, 9, 10, 11, 12, 13, 14, 15, 16, 17, 18, 19, 20, 30, 40, 50, 60, 70, 80, 90, 100 centimeters or more.

According to some embodiments of the invention, applying (e.g., by dispensing, putting, contacting) the electrospun microtube to the water is effected for a predetermined time selected capable of adsorbing the petroleum from the water.

According to some embodiments of the invention, the predetermined time is from a few tens of minutes or several hours to several days. For example, as shown in FIGS. 7A-F, a significant adsorbance of petroleum is achieved within one day (FIG. 7B), even when a second batch of petroleum is added to the electrospun microtubes mats (FIG. 7E).

It should be noted that the predetermined time is depended on the surface area of the electrospun microtubes mats which contacts the petroleum. Thus, a larger surface area of the electrospun microtubes mats will result in a higher ability to adsorb or sequester petroleum on the mats, and therefore a shorter time period will be needed for sequestering or depleting the same amount of petroleum from the water.

Once the petroleum is sequestered or depleted by the electrospun microtubes mats, the mats are removed from the water. It should be noted, that in some cases, following some time in the water, the electrospun microtubes mats are detached from their floating carriers (e.g., from those having the planar shape or geometry), thus, for depleting the petroleum from the water the electrospun mats are to be collected from the water, either alone, or with the floating carriers attached thereto.

According to some embodiments of the invention, removing the electrospun microtubes is performed by collecting the electrospun microtubes with nets having pore sizes which are smaller than the size of the electrospun microtubes mats and/or the floating devices comprising same (as described herein below), so as to enable "fishing" of the electrospun microtubes by the nets, while allowing the water to go through the net's pores. Such nets can be collected by boats, ships, helicopters and airplanes.

According to some embodiments of the invention, the electrospun microtube is devoid of a bacterium (e.g., devoid of any bacterium which can be used for bioremediation of petroleum or other contaminations). It should be noted that such an electrospun microtube is used for adsorbing and/or sequestering the petroleum from the water.

According to some embodiments of the invention, the electrospun microtube further comprises a bacterium capable of degrading petroleum.

According to some embodiments of the invention, the bacterium is encapsulated within the electrospun microtube.

According to some embodiments of the invention, the bacterium is attached to the coat polymer (i.e., the polymer of the coat over the internal surface of the shell). For example, as shown in FIG. 2, *pseudomonas* st. cells which are stained with red were comprised in and attached to the internal surface of the shell.

According to some embodiments of the invention, the shell does not enable migration of the bacterium from the internal lumen of the microtube, or from the coat over the internal surface of the shell to the outer surface of shell.

According to some embodiments of the invention, the electrospun microtube which encapsulates the bacterium is produced by a method which comprises co-electrospinning two polymeric solutions through co-axial capillaries, wherein a first polymeric solution of the two polymeric solutions is for forming a shell of the microtube and a second polymeric solution of the two polymeric solutions is for forming a coat over an internal surface of the shell, the first polymeric solution is selected solidifying faster than the second polymeric solution and a solvent of the second polymeric solution is selected incapable of dissolving the first polymeric solution and wherein the second polymeric solution comprises a bacterium capable of degrading petroleum.

Following is a non-limiting description of electrospun microtubes which encapsulate bacterium: Microtubes can be fabricated by a one-step co-electrospinning process using a double concentric metal spinneret where the shell polymeric solution (e.g., PVDF-HFP solution) flows in the outer annulus and the core polymeric solution (e.g., PVP solution) with the bacterium flows in the inner spinneret. This results in the formation of microtubes encapsulating bacteria and having a double layer wall where the shell polymeric solution (e.g., PVDF-HFP) forms the outer shell and the core polymeric solution (e.g., PVP) forms a thin, well adherent inner coat on top of the shell wall. The electrospinning can be conducted at room temperature with relative humidity of 55-63%. The spinning parameters can be as follows: electrostatic field of about 1 kV/cm, distance between the spinneret and the collection level of about 10 cm. The flow rates of both the core and shell solutions are controlled by two syringe pumps and are 1 ml/hour and 5 ml/hour respectively. It should be noted that more flow rates can be successfully applied and can affect the overall dimension of the tubes and their wall thickness. The hollow fibers are spun directly into an aqueous bath containing phosphate buffer to prevent a fatal dehydration of the bacteria. The conductivity of the collecting bath was about 3.5-4 mS. The fibers are collected on floating carriers, e.g., as a rope wrapped around a rotating plastic cylindrical carrier or as a thin sheet on top of a net substrate.

Immediately after the electrospinning process, the collected hollow fibers are immersed for about 48 hours in a rich medium containing all the required nutrients as carbon (C), Nitrogen (N), phosphor (P), sulfur (s) and salts for the recovery of the bacterium after the electrospinning process, and their reinforcement. An example of such a rich medium includes water supplemented with 0.1 g/l magnesium sulfate, 2 g/l ammonium sulfate, 20 mM BP (phosphate buffer), and 1% (w/w) sodium citrate. The hollow fibers remain wet along the entire process.

As used herein the phrase "reinforcement" refers to breathing, activation, proliferation, and/or relaxation of the bacterium.

According to some embodiments of the invention, the reinforcement is recovery and proliferation of the bacteria within the microtubes.

According to some embodiments of the invention, when the electrospun microtube comprises the bacterium therein (e.g., encapsulated within the microtubes), applying the electrospun microtube to the water is also effected for a predetermined time selected capable of degrading the petroleum from the electrospun microtube.

According to some embodiments of the invention, when the electrospun microtube comprises the bacterium therein (e.g., encapsulated within the microtubes), applying the electrospun microtube to the water is also effected until at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, e.g., 99%, e.g., 100% of the surface area of the electrospun microtube is devoid of the petroleum.

According to some embodiments of the invention, the bacterium which is encapsulated, attached to, or entrapped within the electrospun microtube of some embodiments of the invention maintains the activity, or at least a portion thereof, which it possessed prior to the electrospinning process, or when unattached to the microtube).

The term "activity" as used herein refers to any of a catalytic activity, kinetics, and/or affinity to a substrate or a ligand which the bacterium may have.

As used herein the phrase "at least a portion of the activity" refers to at least about 10%, at least about 20-50%, e.g., more than about 50%, e.g., more than about 60%, e.g., more than about 70%, e.g., more than about 75%, e.g., more than about 80%, e.g., more than about 90%, e.g., more than about 95% of the activity which the bacterium possessed prior to the attachment to the microtube.

According to some embodiments of the invention, the petroleum which is adsorbed or sequestered on the electrospun microtubes of some embodiments of the invention, e.g., those which are devoid of any bacterium or those which encapsulate a bacterium capable of degrading petroleum, can be subjected to bioremediation using a bacterium capable of degrading petroleum.

According to some embodiments of the invention, the method of some embodiments of the invention further comprising: (c) subjecting the electrospun microtube to bioremediation using a bacterium capable of degrading petroleum.

According to some embodiments of the invention, subjecting the electrospun microtubes to bioremediation is effected by submersing at least a portion of the electrospun microtubes, either alone or when attached to the floating carrier in a solution which comprises the bacterium.

According to some embodiments of the invention, submersing is effected until at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 99%, e.g., 100% of the surface area of the electrospun microtube is devoid of the crude oil.

Submerging the electrospun device can be performed by incubating the electrospun microtubes in a solution which comprises the bacterium (at about few OD 600 nm), e.g., at about 15-35° C., optionally with shaking or agitation, for several hours, e.g., at least 24 hours, up to several days (e.g., 1-7 days).

It should be noted that as a result of the submerging, the bacterium can be attached to the microtube shell.

According to some embodiments of the invention, subjecting the electrospun microtube to bioremediation results in immobilization of the bacterium to the electrospun microtube.

According to some embodiments of the invention, the immobilization is to the surface of the electrospun microtube.

Additionally or alternatively, the bacterial cells may be refreshed by immersing the microtube in growth medium which contains usable carbon, nitrogen, phosphorus and sulfur sources and thereby both allowing the cells to proliferate and/or renew their metabolic potential.

According to some embodiments of the invention, the petroleum comprises a petroleum hydrocarbon.

According to some embodiments of the invention, the petroleum comprises an aliphatic molecule (e.g., C5-C36) and/or an aromatic molecule (e.g., C9-C22).

For example, to degrade petroleum pollutants [e.g., aliphatics (e.g., C5-C36) and aromatics (e.g., C9-C22) such as benzene, toluene, ethylbenzene and xylenes (BTEX), phenol, naphthalene or certain hydrocarbons from oil] from water, a bacterium utilizing alkanes as a sole source of carbon and energy can be used. Such alkanes can be, for example, methane, ethane, propane, butane and mixtures thereof).

Non-limiting examples of butane-utilizing bacteria include Gram negative and Gram positive aerobic rods and cocci, facultative anaerobic Gram negative rods, non-photosynthetic, non-fruiting gliding bacteria and irregular non-sporing Gram positive rods. Of the Pseudomonadaceae family comprising Gram-negative aerobic rods and cocci, species of the following genera may be suitable: *Pseudomonas; Variovorax; Chryseobacterium; Comamonas; Acidovorax; Stenotrophomonas; Sphingobacterium; Xanthomonas; Frateuria; Zoogloea; Alcaligenes; Flavobacterium; Derxia; Lampropedia; Brucella; Xanthobacter; Thermus; Thermomicrobium; Halomonas; Alteromonas; Serpens; Janthinobacterium; Bordetella; Paracoccus; Beijerinckia;* and *Francisella.* Of the Nocardioform Actinomycetes family comprising Gram-positive Eubacteria and Actinomycetes, the following genera may be suitable: *Nocardia; Rhodococcus; Gordona; Nocardioides; Saccharopolyspora; Micropolyspora; Promicromonospora; Intrasporangium; Pseudonocardia*; and *Oerskovia*. Of the Micrococcaceae family comprising Gram-positive cocci, the following genera may be suitable: *Micrococcus; Stomatococcus; Planococcus; Staphylococcus; Aerococcus; Peptococcus; Peptostreptococcus; Coprococcus; Gemella; Pediococcus; Leuconostoc; Ruminococcus; Sarcina*; and *Streptococcus*. Of the Vibrionaceae family comprising facultative anaerobic Gram-negative rods, the following genera may be suitable: *Aeromonas; Photobacterium; Vibrio; Plesiomonas; Zymomonas; Chromobacterium; Cardiobacterium; Calymmatobacterium; Streptobacillus; Eikenella*; and *Gardnerella*. Of the Rhizobiaceae family comprising Gram-negative aerobic rods and cocci, the following genera may be suitable: *Phyllobacterium; Rhizobium; Bradyrhizobium*; and *Agrobacterium*. Of the Cytophagaceae family comprising non-photosynthetic, non-fruiting, gliding bacteria, the following genera may be suitable: *Cytophaga; Flexibacter; Saprospira; Flexithrix; Herpetosiphon; Capnocytophaga*; and *Sporocytophaga*. Of the Corynebacterium family comprising irregular, non-sporing Gram-positive rods, the following genera may be suitable: *Aureobacterium; Agromyces; Arachnia; Rothia; Acetobacterium; Actinomyces; Arthrobactera; Arcanobacterium; Lachnospira; Propionibacterium; Eubacterium; Butyrivibria; Brevibacterium; Bifidobacterium; Microbacterium; Caseobacter*; and *Thernoanaerobacter*.

Non-limiting examples of methane-utilizing bacteria include *Methylomonas* (e.g., *Methylomonas albus* such as the BG 8 strain; *Methylomonas methanica* such as the PM strain), *Methylobacter* (e.g., *Methylobacterium organophilum*), *Methylococcus* [e.g., *Methylococcus capsulatus*, such as the Texas strain ATCC 19069 and the Bath strain National Collection of Industrial Bacteria (NCIB) 11132], *Methylocystis* (*Methylocystis parvus*), and *Methylosinus* (e.g., *Methylosinus trichosporium* such as the OB 3b strain, e.g., NCIB No. 11131 and The Fermentation Research Institute (FRI), Japan (as FERM-P4981)].

According to some embodiments of the invention, the bacterium utilizes alkanes as a sole source of carbon and energy.

According to some embodiments of the invention, the bacterium comprises *pseudomonas* st.

According to an aspect of some embodiments of the invention, there is provided a floating device comprising an electrospun microtube attached to a carrier, the carrier being capable of floating on water for at least about 1 hour as described above.

Non limiting examples of the floating device of some embodiments of the invention are provided in FIGS. 8A-D and 9A-D.

Each of devices 120, 130, 160 and 170 comprises carrier 100 with a planar shape and electrospun microtube 110 at least partially attached thereto (FIGS. 8A-D). Each of devices 140, 150, 180 and 190 comprises carrier 100 with a cylindrical shape and electrospun microtube 110 wrapping carrier 100. Carrier 100 is a floating carrier (FIGS. 9A-D).

Description of suitable carriers and electrospun microtubes are provided hereinabove.

According to some embodiments of the invention, the electrospun microtube which is attached to the floating carrier is devoid of bacterium.

According to some embodiments of the invention, the electrospun microtube which is attached to the floating carrier comprises a bacterium capable of degrading petroleum.

According to an aspect of some embodiments of the invention, there is provided an electrospun microtube which comprises the bacterium capable of degrading petroleum according to some embodiments of the invention encapsulated therein, wherein the electrospun microtubes are provided as chopped hollow fibers, chaff hollow fibers, fiber cocoons or the sawdust electrospun elements.

According to an aspect of some embodiments of the invention, there is provided a method of degrading petroleum in water, comprising providing the chopped hollow fibers, chaff hollow fibers, fiber cocoons and/or the sawdust electrospun elements which comprise the electrospun microtubes encapsulating the bacterium capable of degrading petroleum according to some embodiments of the invention to water which comprises the petroleum, thereby degrading the petroleum in the water.

According to some embodiments of the invention, providing the chopped hollow fibers, chaff hollow fibers, fiber cocoons and/or the sawdust electrospun elements is effected by spreading and/or spraying.

According to some embodiments of the invention, the chopped hollow fibers, chaff hollow fibers, fiber cocoons and/or the sawdust electrospun elements are made of biodegradable polymers and therefore are spontaneously degraded in the water without the need to remove them from the water.

The electrospun microtube or the floating device comprising same of some embodiments of the invention can be included in a kit/article of manufacture along with a packaging material and/or instructions for use in any of the above described methods or applications.

The methods described herein may be conducted batchwise.

The electrospun microtube or the floating device comprising same of some embodiments of the invention may be applied in open water, open sea, near-shore, coastal environments, offshore, harbors and even inland oil spills polluting events. The electrospun microtube (provided e.g., as short fibers/tubes forms and 'sawdust' alike arrangement) or the floating device comprising same of some embodiments of the invention can be applied and/or delivered to treat oil spills.

The electrospun microtubes of some embodiments of the invention can be used in the following non-limiting ways:
(i) applying and spreading the sawdust-alike or the short hollow fibers over the oil spill surface whether in sea or in land; or deposing and affixing a large fibrous sheet (e.g., a floating device with a carrier and an electrospun microtube mats attached thereto) on top the oil spill in open sea.
(ii) attaching and/or connecting the electrospun microtubes fibrous mats to existing oil spills treatment equipment including, but not limited to, boats, rafts, booms, skimmers, curtains, screens, baffles, nets and alike; and
(iii) deploying the electrospun microtubes fibrous mats as active nearshore curtain/screen which is fixed along the designated shoreline, actively buffering the shoreline from the polluted water.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

When reference is made to particular sequence listings, such reference is to be understood to also encompass sequences that substantially correspond to its complementary sequence as including minor sequence variations, resulting from, e.g., sequencing errors, cloning errors, or other alterations resulting in base substitution, base deletion or base addition, provided that the frequency of such variations is less than 1 in 50 nucleotides, alternatively, less than 1 in 100 nucleotides, alternatively, less than 1 in 200 nucleotides, alternatively, less than 1 in 500 nucleotides, alternatively, less than 1 in 1000 nucleotides, alternatively, less than 1 in 5,000 nucleotides, alternatively, less than 1 in 10,000 nucleotides.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Md. (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Current Protocols in Immunology" Volumes I-III Coligan J. E., ed. (1994); Stites et al. (eds), "Basic and Clinical Immunology" (8th Edition), Appleton & Lange, Norwalk, Conn. (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., Eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, Calif. (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

General Materials and Experimental Methods

Materials

The polymers poly (vinylidene fluoride-co-hexafluoropropylene) (PVDF-HFP) Mw ~400,000 Da and poly vinyl pyrrolidone (PVP) Mw ~1,300,000 Da were purchased from Sigma (CAS numbers 9011-17-0 and 9003-98-8, respectively) as well as the solvents dimethylformamide (DMF) (CAS number: 68-12-2) and tetrahydrofuran (THF) (CAS number: 109-99-9). Both the solvents and the polymers were used as received. Glycerol was used for the freezing of the bacteria and was sterilized before use. Deionized water was used for the preparation of the aqueous solutions. Isolated, rod-shaped, negative gram bacteria from *pseudomonas* st. which have a specific ability to degrade crude oil, and is referred to herein as "bac #52", were grown in the lab as described below, and used in the electrospinning process as detailed below.

Crude oil was obtained from a refinery industry and was left for 5 hours at 50° C. for evaporation of toxic volatile components before use.

Solutions:

Shell Solution:

15% (by weight) PVDF-HFP solution was prepared by mixing the polymer in a mixture of DMF:THF (3.5:6.5 by weight) in a sealed vial. The solution was subjected to continuous stirring over night at room temperature.

Bacteria Suspension:

*pseudomonas* st. bacterium was grown in a LB agar plate. Few colonies were then transferred to a growing medium containing 0.1 g/l magnesium sulfate, 2 g/l ammonium sulfate, 20 mM phosphate buffer (PB) and 1% (by weight) sodium citrate to reach a high $OD_{600\ nm}$ suspension. After one night of growing at 30° C., the medium was removed by centrifugation at 4° C. and the bacterium precipitate was washed three times with sterile water (each wash involved centrifugation of the bacterial suspension and discarding the supernatant). This resulted in a high concentration aqueous suspension which was adjusted to an $OD_{600\ nm}$ of 18 using sterile water. The bacterium (at $OD_{600\ nm}$ of 18) was either mixed directly with the PVP core solution at a ratio of 3:1 (core solution: bacterium suspension, respectively), or was first frozen at −20° C. in the presence of glycerol [44% (Volume per volume)] immediately after the washing step. In cases where the bacterium was first frozen with glycerol, upon request, the bacterium was thawed, and mixed with the core solution at a ratio of 3:1 (core solution: bacterium suspension with glycerol, respectively), such that the resulting core polymer solution contained about 10% (Volume per volume) of glycerol in addition to water.

Core Solution with Bacterium:

20% PVP (by weight) solution was prepared in water and stirred for a day. Once being completely homogeneous it was mixed with the bacterium suspension having an $OD_{600\ nm}$ of 18 (with or without glycerol) as detailed above in a volume ratio of 3:1 [polymer solution: bacterium suspension (with or without glycerol] to reach a final concentration of 15% (w/w) PVP and $OD_{600\ nm}$ of 4.5. This mixture was and stirred for an hour before spinning.

Core Solution without Bacterium:

15% PVP (by weight) solution was prepared in water and stirred for a day without the addition of bacterium (i.e., being devoid of bacterium).

Electrospinning:

Hollow fibers (i.e., microtubes) were fabricated by a one-step co-electrospinning process using a double concentric metal spinneret where the PVDF-HFP solution (shell solution) flew in the outer annulus and the PVP solution (core solution) with the bacterium flew in the inner spinneret. This resulted in the formation of microtubes encapsulating bacteria and having a double layer wall where the PVDF-HFP formed the outer shell and the PVP formed a thin, well adherent inner coat on top of the shell wall. Alternatively, the hollow fibers were fabricated by a one-step co-electrospinning process using a double concentric metal spinneret where the PVDF-HFP solution (shell solution) flew in the outer annulus and the PVP solution (core solution being devoid of bacterium) flew in the inner spinneret. In both cases, the electrospinning was conducted at room temperature with relative humidity of 55-63%. The spinning parameters were as follows: electrostatic field of about 1 kV/cm, distance between the spinneret and the collection level of about 10 cm. The flow rates of both the core and shell solutions were controlled by two syringe pumps and were 1 ml/hour and 5 ml/hour respectively. The fibers were spun directly into an aqueous bath containing phosphate buffer to prevent a fatal dehydration of the bacteria. The conductivity of the collecting bath was about 3.5-4 mS. The fibers were collected on floating carriers, e.g., as a rope wrapped around a rotating plastic cylindrical carrier or as a thin sheet on top of a net substrate.

Post Spinning Process (for Fibers Encapsulating Bacterium):

Immediately after the electrospinning process, the collected fibers were immersed for about 48-72 hours in a rich medium containing all the required nutrients as carbon (C), Nitrogen (N), phosphor (P), sulfur (s) and salts for the recovery of the bacterium after the electrospinning process, and their reinforcement, e.g., recovery and proliferation of the bacteria within the microtubes. An example of such a rich medium includes water supplemented with 0.1 g/l magnesium sulfate, 2 g/l ammonium sulfate, 20 mM BP (phosphate buffer), and 1% (w/w) sodium citrate). The fibers (i.e., the hollow fibers, which are also referred herein as "microtubes") remained wet along the entire process.

Detection of Bacterial Viability within Electrospun Microtubes—

A small piece from the electrospun microtubes on the net substrate or on the cylinder carrier were subjected to 5-cyano-2,3-ditolyl tetrazolium chloride (CTC) (94498, Sigma) staining according to manufacture's instructions. CTC stains live bacteria which perform aerobic breathing in red [Créach V, Baudoux A C, Bertru G, Rouzic B L. Direct estimate of active bacteria: CTC use and limitations. J Microbiol Methods. 2003 January; 52(1):19-28; which is incorporated herein by reference in its entirety]. The electrospun hollow fibers were also stained using the Syto 9 dye (S34854, Invitrogen Corporation) according to manufacture's instructions. Syto 9 dye is known to stain DNA and RNA, and here it is used to stain the polymers of the electrospun microtubes in green.

Determination of total petroleum hydrocarbons (TPH) using infrared (IR) according to US EPA (United State Environmental Protection Agency) method 418.1, which is used for measurement of fluorocarbon-113 extractable petroleum hydrocarbons from surface and saline waters, industrial and domestic wastes.

Example 1

Preparation of Floating Devices for Petroleum Remediation

Experimental Results
Preparation of Devices—

Two types of experiments were conducted: The first experiment, with hollow fibers collected on floating small cylindrical carriers; and the second experiment, with hollow fibers collected as a thin sheet deposited on a floating net substrate (FIGS. 1A-B). For a detailed analysis of the devices, each experiment was performed with duplicated specimens, i.e., a "working" specimen, which is subject to petroleum contamination, and a duplicated specimen (which was subject to the entire preparation protocol of the "working" specimen) which was subjected to destructive imaging inspection in order to visualize the breathing bacteria within the microtubes.

Imaging of Bacteria within the Microtubes—

After the reinforcement stage of the bacteria, small pieces of fibrous mat were cut from the duplicated specimen and stained with special fluorescence dyes to differentiate between the fiber and the encapsulated bacteria. The 5-cyano-2,3-ditolyl tetrazolium chloride (CTC) dye enables to visualize aerobically breathing bacteria (in red); while Syto 9 dye enables to visualize the fibers themselves (in green). The samples were stained with the above described dyes, and further inspected in a fluorescence confocal microscope (cross sections images that enable a 3D visualization) to ensure that the bacteria are alive (breathing) and indeed encapsulated inside the fibers. As can be seen in FIG. 2, long hollow fibers stained in green encapsulate a large amount of breathing bacteria that have recovered from the spinning process and even proliferated inside the fibers. These results demonstrate the huge effective concentration of the bacteria being confined in such a small volume inside the fibers. Each fiber in the mat is actually a tiny, yet a very effective bioreactor for bacterial degradation of crude oil which penetrates the microtubes.

Example 2

Exposure of the Devices of Some Embodiments of the Invention to Crude Oil

Experimental Results
Subjecting the Electrospun Mats or Cylinders to Crude Petroleum—

After the reinforcement period of the bacteria that are encapsulated within the hollow fibers, the hollow fibers were introduced into baths containing sea water to which crude oil was added. The ratio between the surface area of fibers and the amount of crude oil was 1 ($cm^2$): 13 (µl crude oil) for each treatment batch (i.e., a cycle of subjecting the electrospun hollow fibers to the sea water with crude oil). The baths were placed in a shaker incubator at 30° C. and 60-200 rpm (Revolutions per minute). The baths were daily photographed to follow the gradual degradation of the crude oil.

For electrospun microtubes mats or cylinders devoid of bacterium, the same process was done yet using electrospun microtubes devoid of bacterium.

Adsorption and Absorption of Crude Petroleum by the Devices of Some Embodiments of the Invention—

In order to determine the ability of the electrospun microtubes (devoid of bacteria) to adsorb/absorb crude petroleum, the electrospun microtubes, which are attached to a carrier such as a substrate net or a cylinder, were subjected to crude petroleum in sea water. In each treatment batch, one electrospun microtube mat (having a size of 230 $cm^2$) was contacted with one liter of sea water which included 3 ml of crude oil. As shown in FIG. 7B, the crude petroleum was sequestered from the water onto the electrospun microtubes following one day of contact with the electrospun microtubes.

Sequential Adsorption/Absorption on the Device of Some Embodiments of the Invention—

As is further shown in FIGS. 7A-F, when the electrospun microtubes (devoid of bacteria) were subjected to a second batch of petroleum, i.e., incubation with contaminated sea water (3 ml of crude oil in one liter of sea water) a significant adsorbance of petroleum was seen following a single day (FIG. 7E).

Example 3

Detection of Petroleum Adsorption and Degradation Using the Device of Some Embodiments of the Invention Experimental Results
Detection of Petroleum Adsorption and Degradation Using the Floating Devices of Some Embodiments of the Invention—

In order to determine the ability of the floating devices of some embodiments of the invention to degrade crude oil, the following experiment was conducted using three groups of devices:

(1) horizontal sheets made of microtubes without bacteria (FIGS. 3A-C);
(2) cylindrical carriers enveloped by microtubes (as demonstrated in FIG. 1A) with bacteria (FIGS. 3D-F); and
(3) horizontal sheets made of microtubes encapsulating bacteria (FIGS. 3G-I).

It should be noted that the amount of bacteria present in the microtubes which surround the cylinder carriers (group 2, FIGS. 3D-F) is equivalent to the amount of bacteria present in the microtubes of the horizontal sheets (Group 3, FIGS. 3G-I).

The devices were subjected to sea water with crude oil (as described above), and the presence of residual crude oil was detected and photographed.

As can be clearly seen in FIGS. 3A-I, while the devices of group 1 only adsorbed the crude oil onto the sheet, the devices of group 2 and 3 gradually degraded the oil, such that by the end of 72 hours from the initial exposure to crude oil the sea water were clear and almost no traces of crude oil were observed (FIGS. 3F and 3I). It is important to note that not only the water is clear but also the sheet itself is clear (see for example the image in FIG. 3I), indicating that the bacteria have indeed consumed the oil and completely degraded it (FIGS. 3H and 3I). It should be noted that the cylinder carriers used in group 2 were black before the electrospun microtubes were added around the cylinders (FIG. 1A) and therefore the images shown in FIGS. 3D and 3F seem also black. However, closer inspection of the electrospun fibers enveloping the black cylinders of group 2 revealed that the electrospun hollow fibers are clear, and completely devoid of crude oil by 72 hours following the initial exposure to the crude oil (Data not shown).

The Devices of Some Embodiments of the Invention can Both Adsorb and Degrade Crude Oil—

To further demonstrate the ability of the device of some embodiments of the invention to efficiently eliminate crude oil from sea water, the present inventors have compared the horizontal sheets made of microtubes but being devoid of bacteria (group 1 above) with the horizontal sheets made of microtubes which encapsulate bacteria therein (group 3 above). As is clearly shown in FIGS. 4A-B, the horizontal sheets of group 1 (devoid of bacteria) remained stained by the crude oil (FIG. 4A), while the surrounding water seems clear of crude oil. Thus, the device of group 1 enables adsorption of the crude oil therein (sequesters the petroleum), and thus eliminates (depletes) the crude oil from the sea water. Moreover, as shown in FIG. 4B, in the presence of the bacteria, the crude oil is also eliminated from the device itself (from the electrospun microtubes), and therefore, not only that the device can adsorb and clear the sea water, it can also be re-useable for further treatment cycles of crude oil. These results bring up the understanding that the microtubes mat is both an adsorption media as well as a degrading one. In other words, the mat brings the oil to the bacteria frontier, the oil diffuses into the microtubes and finally the bacteria metabolize the oil. By this, the main drawback in crude oil bioremediation of a poor contact between the bacteria and the oil is overcome.

Example 4

The Device of Some Embodiments of the Invention is Superior than Using Free Bacterial Suspension in Degrading Crude Oil Experimental Results The Device of Some Embodiments of the Invention, which Includes the Bacteria Encapsulated Therein, Exhibits Better Ability to Clear Sea Water than Free Suspensions of the Same Bacteria—

Figures 5A, 5B, 5C:
FIGS. 5A-C are images depicting comparison between the performance of encapsulated bacteria and that of free bacteria suspended in water after being exposed to crude oil for 7 days.

The present inventors compared between carriers coated by microtubes encapsulating bacteria and the same amount of bacteria suspended freely in the water. This experiment was conducted in order to elucidate the implication of encapsulation of bacteria within the fibers. As always, a control group without any bacteria was also surveyed. As can be seen in FIGS. 5A-C, after 7 days from the initial exposure to crude oil, a strong difference is observed between the three groups where the encapsulated bacteria (FIG. 5C) have a clear advantage over the free bacteria (FIG. 5B). It should be noted that this difference was already significant and observed sooner [e.g., after 3 days (data not shown)], but the experiment was continued through 7 days in case the free bacterial suspension requires more time for degrading the petroleum than the encapsulated bacteria. However, by the end of 7 days the water is clear in the Erlenmeyer containing the carriers (FIG. 5C) while in the Erlenmeyer containing free bacteria a layer of crude oil (black layer) can still be seen on the top of the water (FIG. 5B), as well as can be seen in the control group devoid of any bacteria or any electrospun microtubes (FIG. 5A).

Quantitative Analysis of Crude Oil Degradation Using the Device of Some Embodiments of the Invention—

Figure 6B:
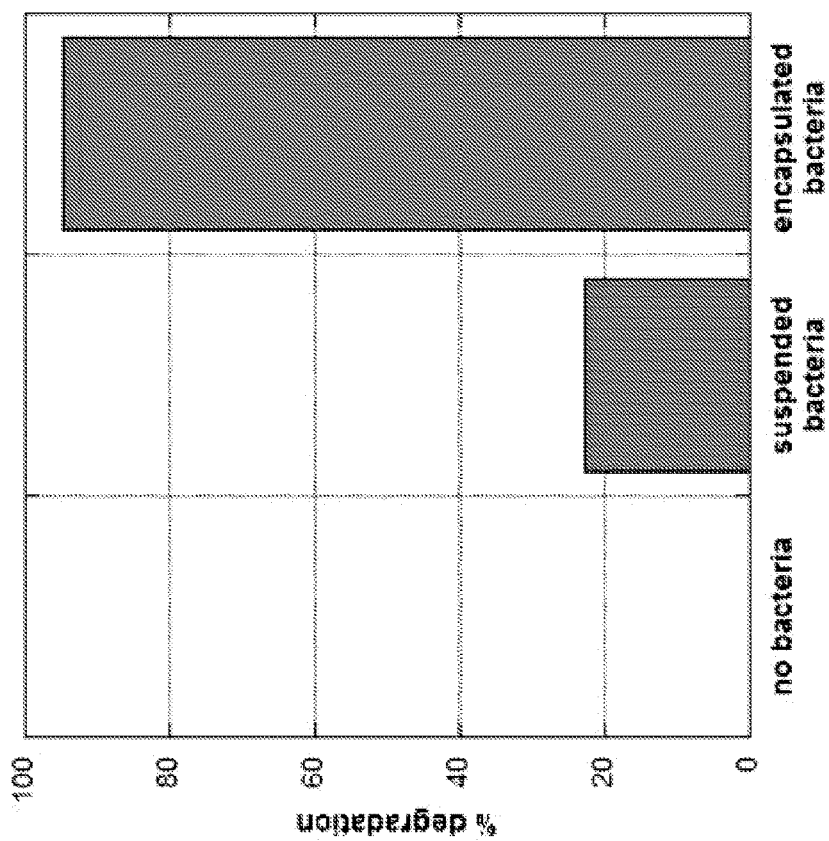
FIGS. 6A-B are histograms depicting results of total petroleum hydrocarbons (TPH) following incubation with the various systems shown in FIGS. 5A-C.
Figure 6A:
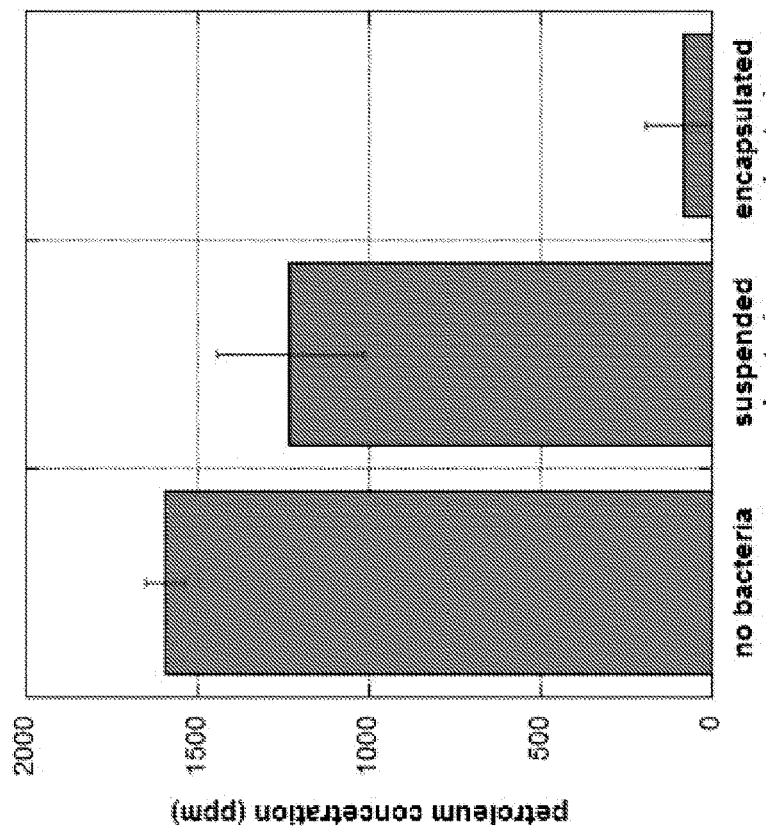
Figure 9B:
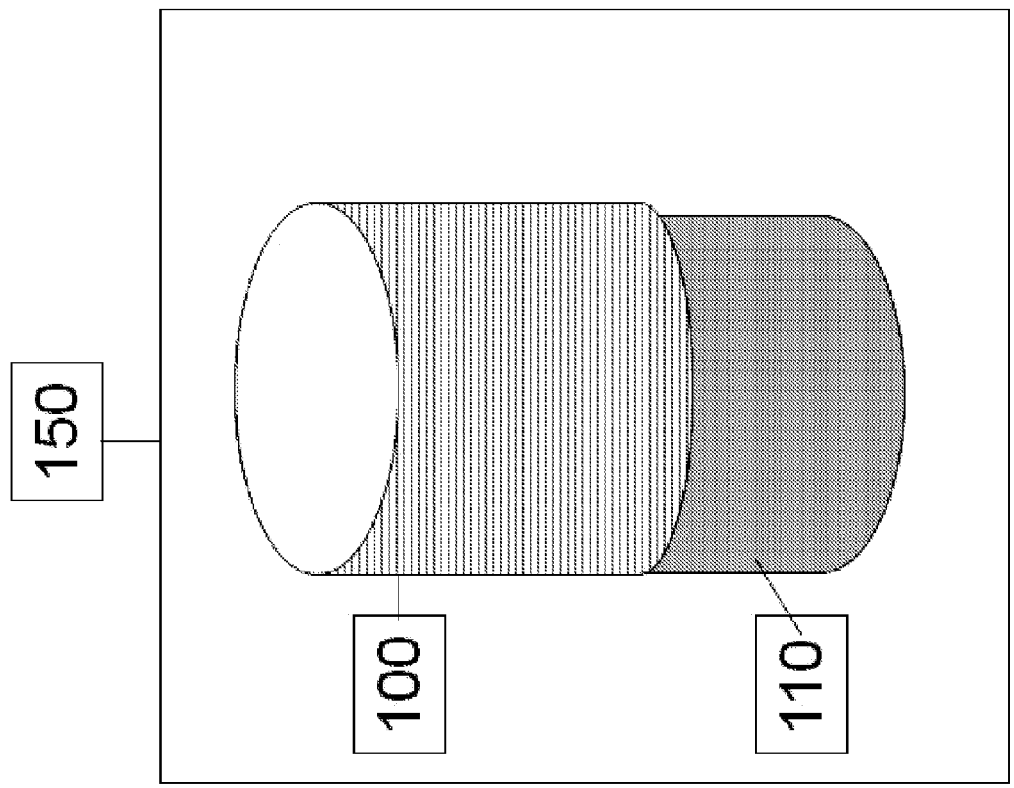
FIGS. 9A-D are schematic illustrations of some embodiments of the device of the invention.
Figure 9A:
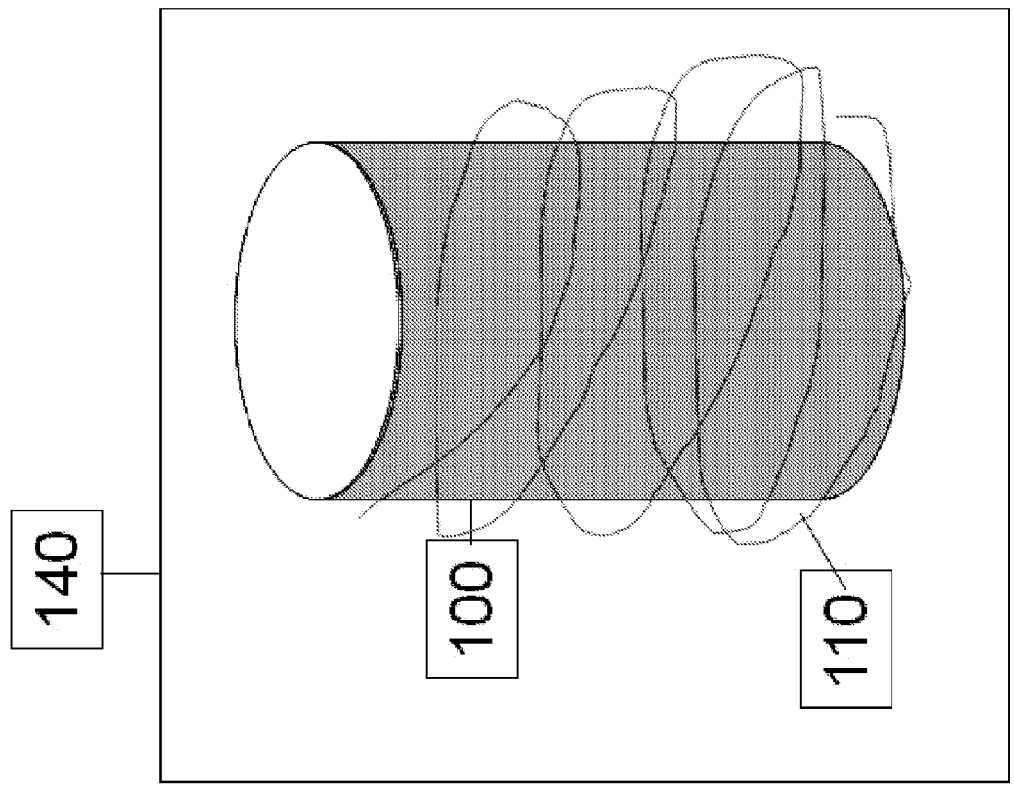
Figure 9D:
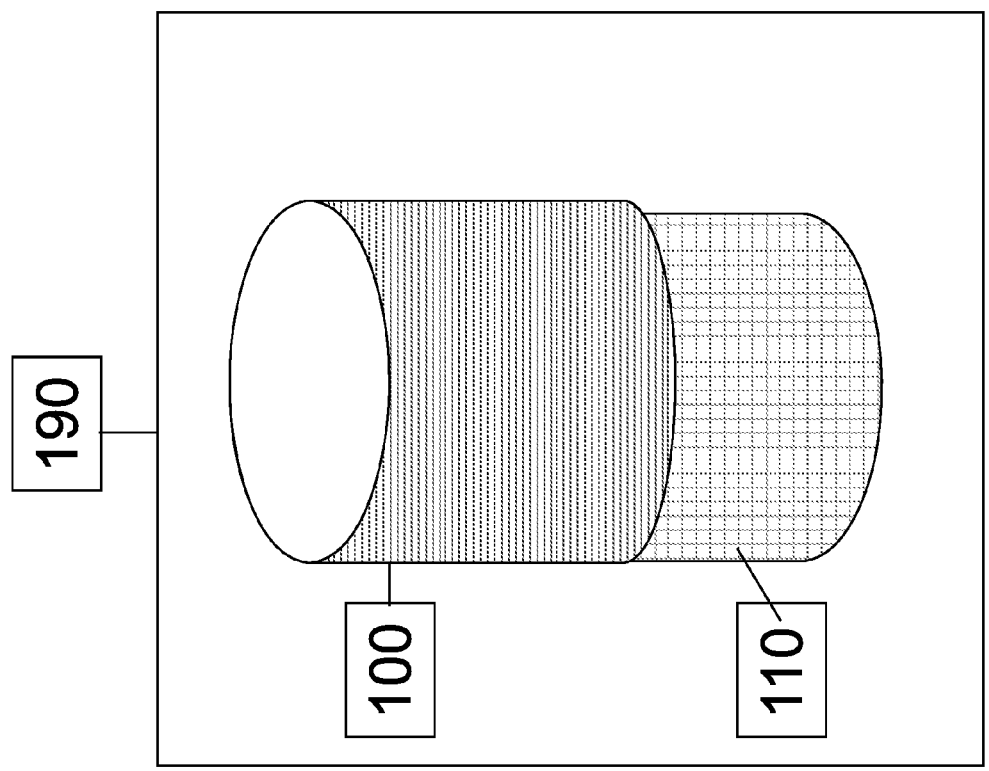
Figure 9C:
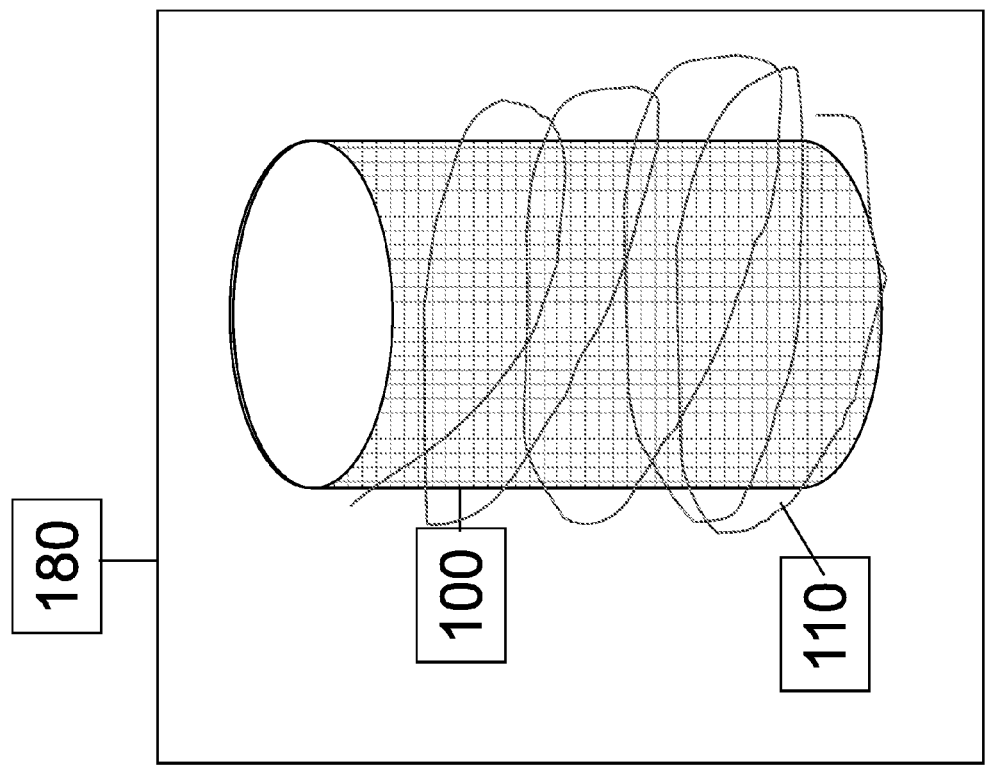

In order to determine quantitatively the results of the experiment shown in FIGS. 5A-C, after 7 days in the presence of the various conditions described hereinabove, the liquids in the Erlenmeyers of the three groups were analyzed for total petroleum hydrocarbons (TPH) using infra red (IR) according to US EPA (United State Environmental Protection Agency) method 418.1. The results are presented in FIGS. 6A and 6B, and support the visual observation. Thus, while in the absence of any bacteria and any electrospun microtubes all the petroleum hydrocarbons remained in the liquid (FIG. 6A, left column, more than 1500 ppm; and FIG. 6B left column, 0% of petroleum degradation), the addition of freely suspended bacteria reduced only partially the amount of petroleum hydrocarbons to about 1200 ppm (FIG. 6A, middle column), which corresponds to about 20% degradation of the initial petroleum hydrocarbons present in the liquid (FIG. 6B, middle column). In sharp contrast to the free bacterial suspensions, in the presence of bacteria encapsulated within the electrospun microtubes of some embodiments of the invention, the amount of petroleum hydrocarbons was less than 100 ppm (FIG. 6A, right column), which corresponds to more than 95% degradation of petroleum hydrocarbons (FIG. 6B, right column) from the initial amount present in the liquid.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of petroleum degradation, the method comprising contacting a water source which comprises the petroleum with an electrospun microtubes comprising a bacterium capable of degrading petroleum, the electrospun microtube is produced by a method which comprises co-electrospinning two polymeric solutions through coaxial capillaries, wherein a first polymeric solution of said two polymeric solutions is for forming a shell of the microtube and a second polymeric solution of said two polymeric solutions is for forming a coat over an internal surface of said shell, said first polymeric solution is selected solidifying faster than said second polymeric solution and a solvent of said second polymeric solution is selected incapable of dissolving said first polymeric solution.

2. A method of depleting a pollutant from water, comprising:
applying an electrospun microtube comprising a bacterium capable of biodegrading the pollutant to the water, the electrospun microtube comprises a shell which comprises poly (vinylidene fluoride-co-hexafluoropropylene) (PVDF-HFP) and a coat over an internal surface of said shell which comprises poly vinyl pyrrolidone (PVP);
wherein said electrospun microtube is produced by a method which comprises co-electrospinning two polymeric solutions through coaxial capillaries, wherein a first polymeric solution of said two polymeric solutions is for forming a shell of the microtube and a second polymeric solution of said two polymeric solutions is for forming a coat over an internal surface of said shell, said first polymeric solution is selected solidifying faster than said second polymeric solution and a solvent of said second polymeric solution is selected incapable of dissolving said first polymeric solution and wherein said second polymeric solution comprises a bacterium capable of degrading said pollutant.

3. The method of claim 1, wherein said microtube is selected from
an electrospun microtube at least partially attached to a floating carrier;
an electrospun microtube comprising a shell which comprises poly (vinylidene fluoride-co-hexafluoropropylene) (PVDF-HFP) and a coat over an internal surface of said shell which comprises poly vinyl pyrrolidone (PVP);
and combinations thereof.

4. The method of claim 1, wherein said electrospun microtube is selected from
an electrospun microtubes in the form of chopped hollow fibers;
electrospun microtubes in the form of fiber cocoons;
electrospun microtubes in the form of sawdust electrospun elements; and
combinations thereof.

5. The method of claim 3, wherein said bacterium is encapsulated within said electrospun microtube.

6. The method of claim 1, wherein said contacting is effected for a predetermined time selected capable of degrading the petroleum from said electrospun microtube or wherein said contacting is effected until at least 80% of the surface area of said electrospun microtube is devoid of the petroleum.

7. The method of claim 1, wherein said bacterium is immobilized to said electrospun microtube or wherein said at least a portion of said electrospun microtube is submerged in a solution which comprises said bacterium.

8. The method of claim 1, wherein said immobilization is to the surface of said electrospun microtube.

9. The method of claim 1, wherein said shell comprises a polymer selected from the group consisting of poly (e-caprolactone) (PCL), polyamide, poly(siloxane), poly(silicone), poly(ethylene), poly(2-hydroxy ethylmethacrylate), poly(methyl methacrylate), poly(vinyl acetate), polyacrylamide, poly(ethylene-co-vinyl acetate), poly(methacrylic acid), polylactide, polyglycolide, poly(lactide-coglycolide), polyanhydride, polyorthoester, poly(carbonate), poly(acrylo nitrile), polyaniline, polyvinyl carbazole, polystyrene, poly(vinyl phenol), polyhydroxyacid, poly(caprolactone), polyanhydride, polyhydroxyalkanoate, polyurethane, collagen, chitosan, starch, and whereas said electrospun coat comprises a polymer selected from the group consisting of poly(acrylic acid), poly(vinyl acetate), polyacrylamide, poly(ethylene-co-vinyl acetate), poly(ethylene glycol), poly(methacrylic acid), polylactide polyglycolide, poly(lactide-coglycolide), polyanhydride, polyorthoester, poly(carbonate), poly(ethylene oxide), polyaniline, polyvinyl carbazole, polystyrene, poly(vinyl phenol), polyhydroxyacid, alginate, starch, and hyaluronic acid and/or wherein said shell further comprises a water soluble polymer selected from the group consisting of: poly(vinyl pyrrolidone), poly(N-vinyl pyrrolidone), poly(vinyl alcohol), poly(acrylic acid), poly(ethylene glycol), poly(ethylene oxide), albumin, alginate, and hyaluronic acid.

10. The method of claim 9, wherein said water soluble polymer forms a polymer blend with said shell polymer.

11. The method of claim 1, wherein said first and said second polymeric solutions are selected from the group consisting of: 10% poly (e-caprolactone) (PCL) in chloroform ($CHCl_3$) and dimethylforamide (DMF) (80:20 by weight) as said first polymeric solution and 4% poly(ethylene oxide) (PEO) in water ($H_2O$) and ethanol (60:40 by weight) as said second polymeric solution, 10% PCL in $CHCl_3$ and DMF (80:20 by weight) as said first polymeric solution and 6% PEO in $H_2O$ and ethanol (60:40 by weight) as said second polymeric solution, 9% PCL in $CHCl_3$ and DMF (90:10 by weight) as said first polymeric solution and 7% PEO in $H_2O$ as said second polymeric solution, 10% PCL in $CHCl_3$ and DMF (80:20 by weight) as said first polymeric solution and 9% poly(vinyl alcohol) (PVA) in water and ethanol (50:50 by weight) as said second polymeric solution, and 10% PCL in $CHCl_3$ and DMF (90:10 by weight) as the first polymeric solution and 4% (by weight) PEO in ethanol: $H_2O$ (26:74 by weight) as a second polymeric solution.

12. The method of claim 1, wherein the petroleum comprises a petroleum hydrocarbon and/or wherein the petroleum comprises an aliphatic molecule and/or an aromatic molecule.

13. The method of claim 3, wherein said bacterium utilizes alkanes as a sole source of carbon and energy and/or wherein said bacterium comprises *Pseudomonas* sp.

14. The method of claim 3, wherein said carrier comprises a net substrate with a planar shape or wherein said carrier comprises a cylindrical carrier.

* * * * *